US011370574B2

(12) United States Patent
Eichenberger et al.

(10) Patent No.: US 11,370,574 B2
(45) Date of Patent: Jun. 28, 2022

(54) APPLICATOR APPARATUS AND METHOD

(71) Applicant: DOVER EUROPE SARL, Vernier (CH)

(72) Inventors: Jonas Eichenberger, Zurich (CH); Tobias Bleiker, Zurich (CH); Simon Weidmer, Zurich (CH)

(73) Assignee: Dover Europe Sàrl, Vernier (CH)

( * ) Notice: Subject to any disclaimer, the term of this patent is extended or adjusted under 35 U.S.C. 154(b) by 0 days.

(21) Appl. No.: 17/298,532

(22) PCT Filed: Nov. 29, 2019

(86) PCT No.: PCT/EP2019/083133
§ 371 (c)(1),
(2) Date: May 28, 2021

(87) PCT Pub. No.: WO2020/109575
PCT Pub. Date: Jun. 4, 2020

(65) Prior Publication Data

US 2022/0009664 A1 Jan. 13, 2022

(30) Foreign Application Priority Data

Nov. 30, 2018 (GB) ..................................... 1819602

(51) Int. Cl.
*B32B 41/00* (2006.01)
*B65C 9/36* (2006.01)
(Continued)

(52) U.S. Cl.
CPC .............. *B65C 9/36* (2013.01); *B65C 9/1876* (2013.01); *B65C 9/28* (2013.01); *B65C 9/40* (2013.01)

(58) Field of Classification Search
CPC .......... B65C 9/36; B65C 9/1876; B65C 9/28; B65C 9/40
(Continued)

(56) References Cited

U.S. PATENT DOCUMENTS 4,844,771 A 7/1989 Crankshaw et al.
5,382,313 A 1/1995 Eminger
(Continued)

FOREIGN PATENT DOCUMENTS

CN 201510936711 12/2015
CN 105438576 3/2016
(Continued)

OTHER PUBLICATIONS

PCT International Search Report/Written Opinion in International Appln. No. PCT/EP2019/083133, Issued by European Patent Office dated Jul. 3, 2020, 27 pgs.
(Continued)

*Primary Examiner* — Carson Gross
*Assistant Examiner* — Joshel Rivera
(74) *Attorney, Agent, or Firm* — Fish & Richardson P.C.

(57) ABSTRACT

An applicator apparatus including an applicator pad (10) and an actuator (180) for positioning the applicator pad (10) in a desired position, the applicator pad (10) being attached to the actuator (180) by an attachment member (40), wherein the attachment member (40) enables articulation between the applicator pad (10) and the actuator (180).

22 Claims, 11 Drawing Sheets

(51) Int. Cl.

| | |
|---|---|
| ***B65C 9/18*** | (2006.01) |
| ***B65C 9/28*** | (2006.01) |
| ***B65C 9/40*** | (2006.01) |

(58) Field of Classification Search

USPC .................... 156/60, 64, 350, 351, 378, 379

See application file for complete search history.

(56) References Cited

U.S. PATENT DOCUMENTS

| | | | | |
|---|---|---|---|---|
| 5,865,918 | A * | 2/1999 | Franklin et al. .......... B65C 9/28 156/64 | |
| 9,802,728 | B1 | 10/2017 | Rodgers et al. | |
| 2002/0157679 | A1 | 10/2002 | Yiu | |
| 2004/0144497 | A1 | 7/2004 | Bixen | |
| 2014/0014264 | A1 | 1/2014 | Bixen | |
| 2017/0334594 | A1 | 11/2017 | Woods et al. | |
| 2018/0334279 | A1 | 11/2018 | Korthauer et al. | |

FOREIGN PATENT DOCUMENTS

| | | |
|---|---|---|
| CN | 201710310473 | 7/2016 |
| CN | 2017107380591 | 11/2017 |
| CN | 105775289 | 5/2018 |
| CN | 108794513 | 11/2018 |
| DE | 9304848 | 3/1993 |
| DE | 102008032019 | 1/2010 |
| DE | 102020055157 | 6/2012 |
| EP | 0026753 | 9/1980 |
| EP | 2361837 | 8/2011 |
| EP | 2495180 | 2/2012 |
| EP | 2712689 | 4/2014 |
| EP | 2998234 | 3/2016 |
| EP | 3031736 | 6/2016 |
| GB | 2005220 A | 9/1978 |

OTHER PUBLICATIONS

Anonymous, Vacuum Sensors Information | Engineering 360, Feb. 2, 2018 & downloaded from Web Aug. 7, 2020, 4 pgs.

International Preliminary Report on Patentability in International Appln. No. PCT/EP2019/083133, dated May 25, 2021, 17 pages.

Reply to EP Office communication pursuant to Rules 161(1) and 162 EPC dated Jul. 14, 2021, with amended claims, filed on Jan. 21, 2022, in European Appln. No. 19813310.0, 9 pages.

* cited by examiner

APPLICATOR APPARATUS AND METHOD

DESCRIPTION OF INVENTION

Embodiments of the invention relate to an applicator apparatus and parts thereof and associated methods, in particular but not exclusively to a labelling apparatus and methods for use with a print and apply printing apparatus.

It is known in the art of printing, in particular label printing, for labels to be attached to a carrier web, which passes a printhead of a printing apparatus to be printed, before the labels are removed from the carrier web and applied to an item, for example a package. Each label is typically manufactured from paper and has a printing side, which passes adjacent the printhead for ink to be applied to it, for example to provide information, barcodes, images, etc., and an attachment side, which typically bears a layer of adhesive which initially adheres the label to the carrier web, and then subsequently to the item to which the label is applied. It is also known for labels to be manufactured from thin plastics materials. Other materials may be used. The carrier web may have a waxy texture or coating, so as to enable the separation of the labels from the carrier web. It is known in the art to provide an applicator pad or "tamp pad" to apply each printed label to a respective item. Each label is fed away from the printhead, towards the applicator pad, and the printing side of the label as held adjacent the applicator pad, typically by a vacuum. The applicator pad may then move relative to the printhead, towards a surface of the item to which the label is to be applied, and place the attachment side of the label against the surface, such that the adhesive adheres the label to the surface of the item. The air pressure in the region of the applicator pad and the label may then be increased, so as to reduce the suction between the applicator pad and the label, such that the label detaches from the applicator pad and remains adhered to the surface of the item. Movement of the applicator pad is typically effected by an actuator, and the applicator pad is typically secured to the actuator by screws or similar mechanical fixings, meaning that one or more tools is required to remove the applicator pad for maintenance or replacement. Pneumatic pipes and electronic connections typically have to be connected between the actuator and the applicator pad. Therefore, replacement and maintenance of an applicator pad is time consuming, and there is significant opportunity for human error to occur. This can cause production delays and damage to apparatus.

Known applicator pads are designed to handle a range of label sizes, typically from 26 mm×26 mm to 170 mm×226 mm. Industry convention has been to utilise plastic pneumatic pipes to transfer air at high pressure, e.g. 1-10 bar, (100,000 Pa-1,000,000 Pa) to create the vacuum required to hold a label adjacent the applicator pad and increase the air pressure during application. The high pressure air is then typically used to create the vacuum at the pad itself meaning additional weight and complexity on the moving pad.

It is known to use an array of jets which are separate from the applicator pad to direct each label as it moves away from the printhead, so as to move each label into a region influenced by the vacuum which is generated by the applicator pad.

It is also known to provide actuators for moving an applicator pad to apply labels to a target surface. Known actuators include heavy/and or bulky moving parts. Actuators are typically pneumatically or electrically activated.

In accordance with embodiments of the invention, there is provided an applicator apparatus including an applicator pad and an actuator for positioning the applicator pad in a desired position, the applicator pad being attached to the actuator by an attachment member, wherein the attachment member enables articulation between the applicator pad and the actuator.

Part of the attachment member may be arranged to slidably engage with a part of the applicator pad.

The attachment member may include an engagement member which is arranged to engage with an engagement formation of the applicator pad in a dovetail arrangement.

The attachment member and the applicator pad may be configured to snap-fit with one another.

The applicator apparatus may include a locking formation for locking the applicator pad in attachment with the actuator.

The attachment member may include a universal joint.

The attachment member may enable pneumatic coupling between the applicator pad and the actuator.

The applicator apparatus may include an air flow generator.

The air flow generator may be carried by a part of the actuator.

The air flow generator may be located on a stationary part of the applicator apparatus.

The air flow generator may be operable to produce an air flow with an air pressure of up to approximately 1000 Pa.

The applicator pad may have a first, label receiving side and a second side, a label entrance edge and an opposite edge, a fluid inlet and a fluid conduit arrangement which may be fluidly communicable with the fluid inlet to deliver fluid from the fluid inlet to a plurality of positions on the first label receiving side.

The fluid inlet of the applicator pad may be fluidly communicable with the air flow generator via the attachment member.

The fluid inlet may be positioned near to the label entrance edge of the applicator pad and at least a part of the conduit arrangement may extend away from the label entrance edge of the applicator pad towards the opposite edge of the applicator pad.

The fluid conduit arrangement may include a plurality of conduits.

Two or more of the plurality of conduits may include respective portions which are substantially parallel with one another.

The cross-sectional area of the fluid inlet may be approximately 25% to 75% of the area of the applicator pad, and preferably may be approximately 50% of the area of the applicator pad.

The label receiving side of the applicator pad may include a portion having a roughened surface, and the portion may cover at least a part of the first, label receiving side of the applicator pad. The portion may cover multiple parts of the first, label receiving side of the applicator pad. The portion may cover the entire first, label receiving side of the applicator pad.

The roughened surface may be provided by an additive manufacturing process and/or a moulding process.

The applicator pad may include one or more stiffening ribs.

The applicator pad may include one or more nozzles terminating at or near the label receiving side of the applicator pad, the or each nozzle being fluidly communicable with a pressurised fluid source.

The pressurised fluid source may be the air flow generator.

The applicator apparatus may include a plurality of nozzles, at least some of which may be fluidly communicable with the source of pressurised fluid via a distribution chamber.

The applicator apparatus may include at least one opening in the label side of the applicator pad, the or each opening being associated with a corresponding nozzle.

Each opening may surround the corresponding nozzle.

There is also provided an applicator apparatus including an applicator pad for applying a label to an item, an air flow generator, an air guide for guiding the air flow between the air flow generator and the applicator pad, and a label detector for detecting the presence of a label adjacent the applicator pad, wherein the label detector includes a flow sensor for measuring air flow at a location between the air flow generator and the applicator pad.

The flow sensor may be a differential pressure sensor.

The air guide may include an obstacle, and the differential pressure sensor may measure air pressure on both sides of the obstacle.

The applicator apparatus may include any or all of the features set out above, in any combination.

There is also provided an actuator for an applicator apparatus, the actuator being operable to position an applicator pad in a desired position relative to an item to which a label is to be applied, the actuator including one of an extruded or pultruded body to which the applicator pad is connectable.

The actuator may include at least two telescopic bodies.

The actuator body may enable fluid communication between the applicator pad and a source of pressurised fluid and/or an air flow generator.

The actuator may include at least one bearing member which is engageable with a part of a label printing apparatus to facilitate movement of at least a part of the actuator relative to the part of the label printing apparatus.

The or each bearing member may be a roller.

The actuator may be used in combination with any or all of the features of the applicator apparatus set out above.

There is also provided a method of controlling an applicator apparatus including an applicator pad for applying a label to an item, an actuator for positioning the applicator pad in a desired position relative to an item, and a control system for controlling movement of the actuator, the control system including at least one motor, the method including determining a desired position of the applicator pad, determining a required speed of the actuator to achieve the desired position of the applicator pad, taking into account at least one physical parameter of the actuator and/or the applicator pad, and calculating a motor torque required to achieve the desired position of the applicator pad, taking into account a current position of the applicator pad.

The method may include determining an impact of the applicator pad with the item by detecting one or more of an increase in motor current, a change in speed of movement of the actuator and an increase in a difference value between the desired position of the applicator pad and an actual position of the applicator pad.

The method may include determining an impact zone, and the control system may operate under different conditions when the actual position of the applicator pad is determined to be within the impact zone.

The method may be for applying a label to each of a series of items, wherein the control system may be operable to determine a respective impact zone associated with each item to which a label is to be applied.

The method may include reducing control stiffness, and/or operating the motor in an open-loop torque mode and/or utilising a model-based feed-forward algorithm to control the motor when the applicator pad is determined to be in the impact zone.

The method may include adjusting the control parameters of the control system in response to detecting a collision between the applicator pad and the item.

Embodiments of the invention will now be described, by way of example only, with reference to the accompanying drawings, of which:

Figure 1:
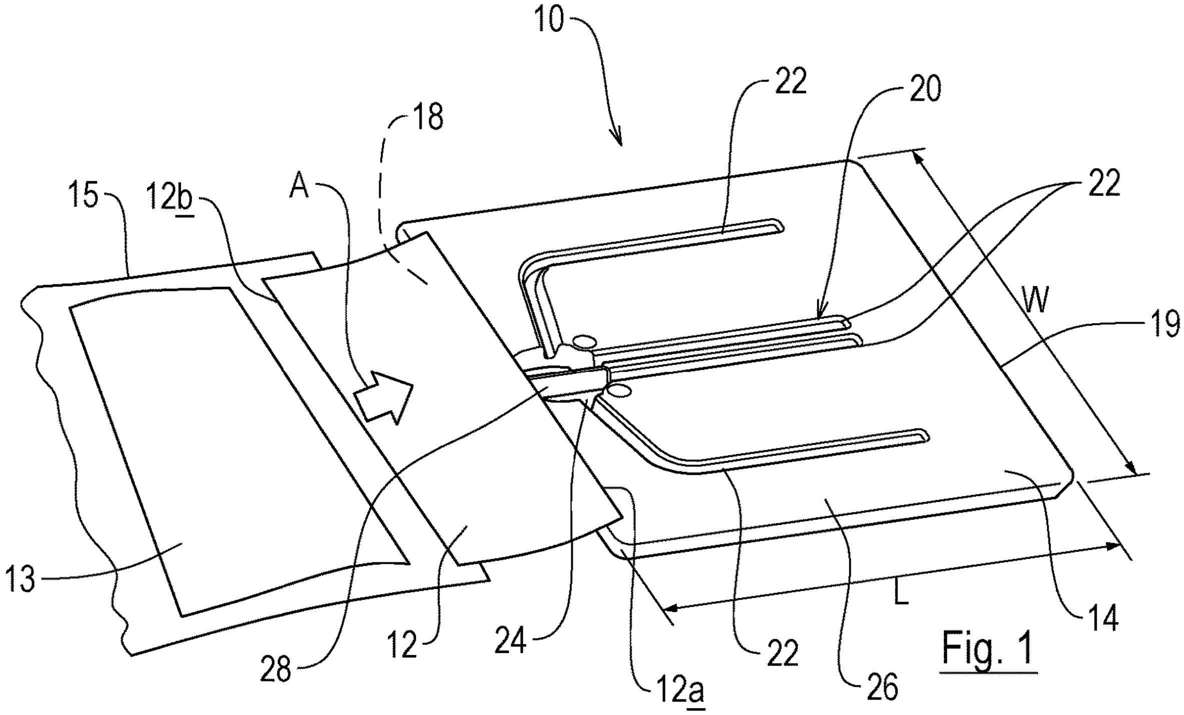
FIG. 1 is an illustrative perspective view showing a first side of an applicator pad receiving a part of a label.
Figure 2:
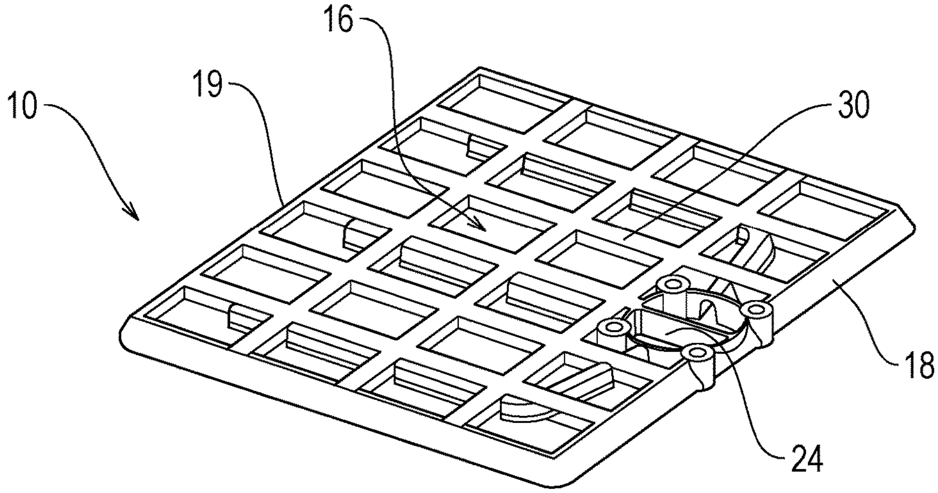
FIG. 2 is an illustrative perspective view showing a second side of the applicator pad of FIG. 1.

Referring to FIGS. 1 and 2, there is shown an applicator pad 10 for a labelling apparatus, receiving a label 12. The applicator pad 10 has a first side or label receiving side 14 and a second side 16. The applicator pad 10 also has a label entrance edge 18, and an opposite edge 19. The label 12 has a leading edge 12*a* and a trailing edge 12*b*.

The applicator pad 10 includes a conduit arrangement 20, which in embodiments includes a plurality of conduits 22 which are fluidly communicable with one another. The conduit arrangement 20 is also fluidly communicable with an inlet 24, which may be an air inlet. In embodiments, the inlet 24 may be fluidly communicable with each of the conduits 22. The inlet 24 is positioned adjacent the label entrance edge 18. For example an edge of the inlet 24 may be located approximately 2-15 mm (preferably approximately 12 mm) from the label entrance edge 18 of the pad 10. The inlet 24 and at least a part of the conduit arrangement 20 may be fluidly communicable with the label receiving side 14 of the applicator pad 10. Fluid, for example air, may be drawn into the applicator pad 10 via at least a part of the inlet 24 and/or at least a part of the conduit arrangement 20. The inlet 24 may have a large cross-sectional area in the plane of the label receiving side 14.

The cross-sectional area of the inlet 24 in a plane substantially parallel to or co-incident with the label receiving side 14 may be dependent upon the size of the applicator pad 10. The inlet 24 may be substantially circular in cross section, or it may be substantially rectangular in cross section, for examples. The cross-sectional area of the inlet 24 in a plane substantially parallel to or co-incident with the plane of the label receiving side 14 may be approximately 240 $mm^2$ for labels larger than 40 mm wide and 30 mm long. The minimum cross sectional area of the inlet 24 in the plane of the label receiving side 14 is 140 $mm^2$. Smaller cross sectional areas of the inlet 24 may deteriorate the air flow thus affecting the label attraction properties. For smaller labels (i.e. labels having dimensions less than 40 mm×30 mm) the cross-sectional area of the inlet 24 may be smaller. The cross-sectional area may be 48 $mm^2$. Ideally the inlet 24 should cover approximately 50% of the small label pad 10.

The cross sectional area of each of the conduits 22 may be small relative to the cross-sectional area of the inlet 24, and each conduit 22 may be between approximately 1 mm and approximately 5 mm wide, and may be approximately 2 mm wide, for example.

The applicator pad 10 may include one or more guard ribs 28 which extend across at least a part of the inlet 24. The or each guard rib 28 may extend in a plane which is substantially perpendicular to the plane of the applicator pad and hence substantially perpendicular to the cross-section of the inlet 24. The or each guard rib 28 may inhibit labels and/or foreign objects entering (for example being sucked into) the inlet 24. The number of guard ribs 28 may be governed by the thickness of the labels being used and the air pressure.

In embodiments, the conduit arrangement 20 may include four conduits 22, for example (as shown in FIG. 1). More or fewer than four conduits 22 may be provided. The or each conduit 22 may include a substantially straight portion. A part of one or more of the conduits 22 may extend away from the label entrance edge 18 of the applicator pad 10, towards the opposite edge 19. The substantially straight portion of the or each conduit 22 may extend away from the label entrance edge 18 of the applicator pad 10, towards the opposite edge 19. Where the conduit arrangement 20 includes a plurality of conduits 22, corresponding portions of two or more of the plurality of conduits 22 may be parallel with one another.

The purpose of the conduit arrangement 20 and the inlet 24 is to provide a suction or vacuum effect, which is capable of holding the label 12 adjacent the label receiving side 14 of the applicator pad 10, against gravity, for example. An air flow generator, for example a fan, is provided, and is fluidly communicable with the inlet 24. The conduit arrangement 20 and/or the inlet 24 enables labels 12 to be attracted towards the applicator pad 10 without the need for additional directional air jets, for example external air jets, or other form of directing apparatus which are required to guide the labels towards the applicator pads of known label applicator systems.

The label receiving side 14 of the applicator pad may include a portion having a structure, which may be a roughened surface, which has the effect of reducing the contact surface area between the label receiving side 14 and the label 12. The portion 26 having the roughened surface may extend over the entire surface are of the label receiving side 14. The portion 26 having the roughened surface may extend over a part or parts of the surface of the label receiving side 14. The portion 26 having the roughened surface may include a number of discrete portions. This provides a low adherence or "non-stick" effect which is advantageous in a situation where the adhesive side of a label 12 comes into contact with the applicator pad. Such an inadvertently adhered label 12 may be easily removed manually, or may even fall off of its own accord as a result of the roughened surface.

The structure of the portion 26 of the label receiving side 14 may be provided in or on the label receiving side 14 of the applicator pad 10 as the applicator pad 10 is manufactured. The applicator pad 10 may be moulded, for example injection moulded. The applicator pad 10 may be produced by additive manufacturing, e.g. 3D printing or Selective Laser Sintering (SLS). If the applicator pad 10 is produced by additive manufacturing (which is a powder-based manufacturing process), an outer surface (which includes the label receiving side) may be naturally rough, providing the structure or roughened surface which provides the low adherence property of the label receiving side 14 of the applicator pad 10. If the applicator pad 10 is produced by a moulding process, the structure providing the low adherence property of the label receiving side 14 may be moulded into the portion 26 of the label receiving side 14.

The second side 16 of the applicator pad 10 may include one or more stiffening ribs 30. The ribs 30 may be provided in a grid arrangement, for example, or another advantageous arrangement, for example a honeycomb, or triangular arrangement. The arrangement of the ribs 30 may be selected to provide optimum torsional stiffness. The cross-sectional shape of the or each rib 30 (i.e. in a plane substantially perpendicular to the plane of the second side 16 of the applicator pad 10) may be uniform, or may vary with the height of the rib 30. For example, the or each rib 30 may be T-shaped. The cross-sectional shape of the or each rib 30 may be dependent upon the manufacturing process.

A desirable ratio of stiffness to weight of the applicator pad 10 may determine the cross-sectional shape and/or height of the or each rib 30, and/or the number of ribs 30 provided and/or the arrangement of the ribs 30. The thickness of the applicator pad 10 (not including ribs 30) may be between approximately 0.5 mm and approximately 1 mm. Each rib 30 may have a width of between approximately 1 mm and 1.5 mm and a height (perpendicular to the pad 10) of between approximately 3 mm and 15 mm, and may be approximately 6 mm, for example.

In order to facilitate the manufacture of embodiments of the applicator pad 10, a parametric computer aided design (CAD) model may be provided to create instructions for an additive manufacturing method. Entering the desired applicator pad width W and length L into the model will generate instructions to produce all of the features of the applicator pad 10. It may be possible for a designer to select whether to include optional features.

In use, a label 12 is transported away from a printhead of a printing apparatus, typically by motor-driven spools which wind a carrier web 15 bearing a series of labels 12, 13 in the required direction, and each label 12, 13 is separated from the carrier web 15, for example by a peel-off roller or blade. The label 12 is travelling in the direction shown by the arrow marked A in FIG. 1. As the label 12 is removed from the carrier web 15, the label 12 travels towards the label entrance edge 18 of the applicator pad 10. The leading edge 12*a* of the label 12 is separated from the carrier web 15 before the trailing edge 12*b*, and the leading edge 12*a* of the label 12 engages with the label receiving side 14 of the applicator pad 10 before the trailing edge 12*b* of the label 12 has been separated from the carrier web 15.

As the label 12 moves across the label receiving side 14 of the applicator pad 10 in the direction of arrow A, at least a part of the label 12 covers an increasing proportion of the inlet 24 of the applicator pad 10. As the inlet 24 is covered, air is then sucked through at least a part of the conduit arrangement 20. As the label 12 continues to travel in the direction of arrow A, the conduit arrangement 20 is progressively covered, and air is then sucked through an uncovered part or parts of the conduit arrangement 20. This arrangement means that as the label 12 moves across the applicator pad 10, the effective air inlet (i.e. the part or parts of the air inlet 24 and/or the conduit arrangement 20 which is/are uncovered at a given moment) moves further away from the label entrance edge 18 of the applicator pad 10. This enables the transfer of labels having a range of sizes by the same applicator pad 10. The largest label 12 which can be handled by the applicator pad is determined by the physical size of the applicator pad 10, and the smallest label size is defined by a rectangular area defined by the outermost conduits 22 and may be approximately two thirds of the length (measured from the label entrance edge 18 towards the opposite edge 19) and two thirds of the width W (symmetric about a centreline of the applicator pad 10) of the label receiving side 14 of the applicator pad 10. The width of the conduits 22 is selected to ensure that even the thinnest labels do not become distorted or buckled in the vicinity of the conduits 22. The width of each conduit may be selected such that a resulting total vacuum area at a position behind the inlet 24 (i.e. between the inlet 24 and the air flow generator, rather than on the label receiving side 14 of the applicator pad 10) is no more than twice the cross-sectional area of the inlet 24 plus the cross-sectional area of portions of the conduits 22 positioned between the inlet 24 and the opposite edge 19 of the label pad 10.

Alternative arrangements of the applicator pad 10 and the conduit arrangement 20 may be selected, and the optimum arrangement may be selected based upon the size of the labels intended to be printed by the printing apparatus with which the applicator pad 10 is intended to be used.

Advantages of embodiments of the applicator pad 10 described herein are that the roughened portion 26 of the label receiving side 14 may eliminate the need to coat the label receiving side 14 (or a portion or portions of the label receiving side 14) with a “non-stick” coating. This removes a manufacturing step. The applicator pad 10 is particularly optimised for high volume, low air pressure air flows as produced by a localised air flow generator (e.g. fan) system, in contrast to the low volume, high pressure air flows produced by an external pneumatic generator, i.e. factory generated air.

Figure 3:
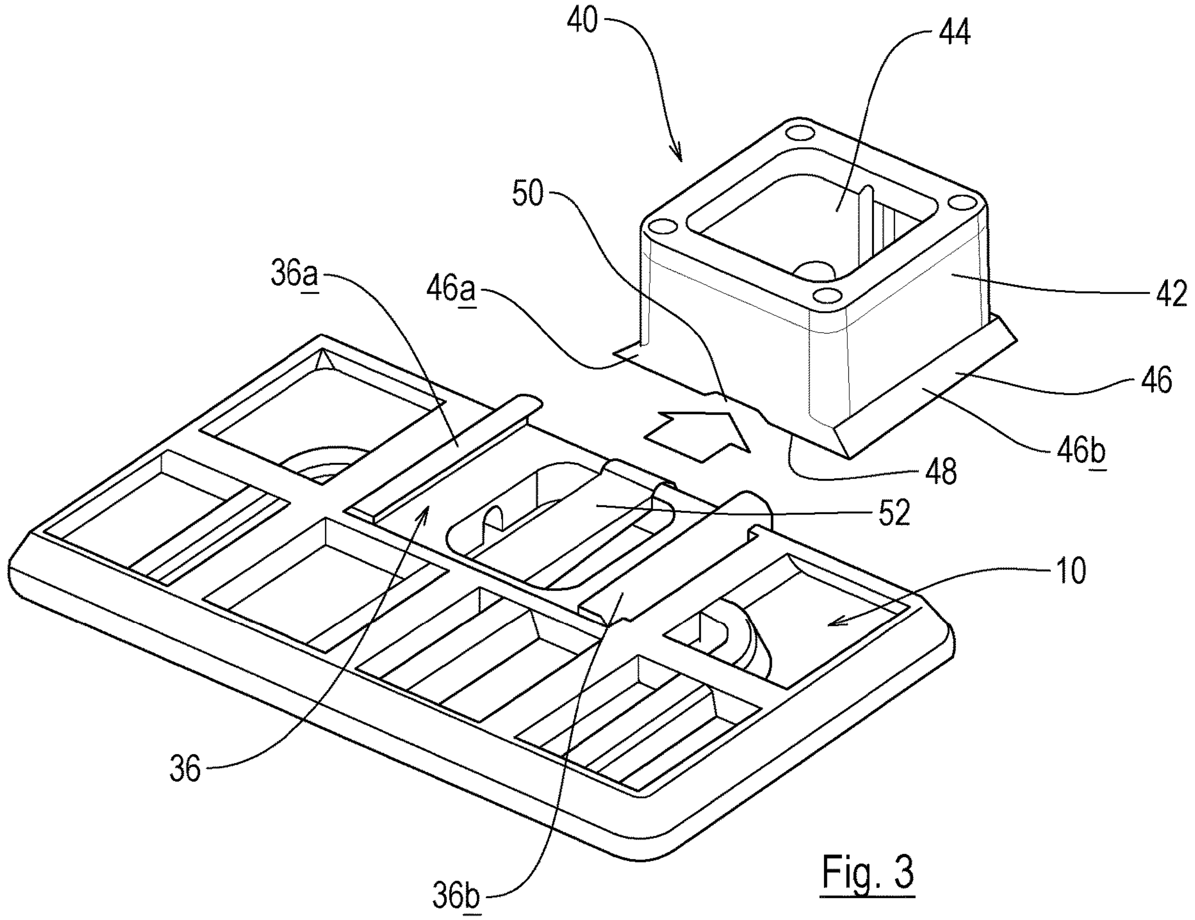
FIG. 3 is an illustrative perspective view of an applicator pad and an associated attachment device for attaching the applicator pad to an actuator.

Referring to FIG. 3, in particular, the applicator pad 10 forms part of an applicator apparatus, and is attached to an actuator, which effects movement of the applicator pad 10, by an attachment member 40. The attachment member 40 may provide at least one of mechanical coupling and pneumatic coupling between the applicator pad 10 and the actuator. The attachment member 40 includes a body 42. In embodiments a cross-section of part of an outer surface the body 42 may be substantially square. The body 42 includes an opening 44. The opening 44 may extend all the way through the body 42. The attachment member 40 may include an engagement member 46. In embodiments the engagement member 46 may include a pair of protrusions 46*a*, 46*b*. Each protrusion 46*a*, 46*b* may be substantially triangular in cross section, but it will be appreciated that other forms may be possible or desirable. For example, the or each protrusion may be substantially flat, square, rectangular or rounded in cross section. In embodiments, the or each engagement member 46 may extend laterally outwardly from the body 44, at or near to a base 48 of the attachment member 40. The attachment member 40 may also include a locking formation 50. In embodiments, the locking formation 50 may be an opening or slot. The locking formation may be provided in the base 48 of the attachment member 40. The locking formation 50 may be provided substantially centrally of the attachment member 40, and may extend in a direction which is substantially parallel with the or each engagement member 46.

The applicator pad 10 may include an engagement formation 36 which is engageable with the engagement member 46 of the attachment member 40. In embodiments, the engagement formation 36 may include one or more lips 36*a*, 36*b*, which extends from the second side 16 of the applicator pad. The or each lip 36*a*, 36*b* may provide a channel in which a corresponding one of the or each protrusion 46*a*, 46*b* of the engagement member 46 is receivable. The or each lip 36*a*, 36*b* may be angled or curved to provide the respective channel of the engagement formation 36.

The engagement member 46 and the engagement formation 36 may be configured to enable sliding engagement of the attachment member 40 to the applicator pad 10. The engagement member 46 and the engagement formation 36 may enable the attachment member 40 to attach to the actuator in a ‘dovetail’ arrangement. The attachment member 40 may enable a ‘snap fit’ engagement between the applicator pad 10 and the actuator.

The engagement formation 36 may be located near or adjacent the label entrance edge 18 of the applicator pad 10. The engagement formation 36 may be located near or adjacent the inlet 24. A part or parts of the engagement formation 36 may partially or substantially surround the inlet 24.

The applicator pad 10 may include a locking member 52 which is engageable with the locking formation 50 of the attachment member 40. In embodiments, the locking member 52 may include a tongue, which is receivable in the locking formation 50 of the attachment member 40. The locking member 52 may extend across at least a part of the inlet 24, in a direction which is substantially parallel with the or each lip 36*a*, 36*b* of the engagement formation 36. The locking member 52 may include a detent or lip 54 which is engageable with a part of the attachment member 40, to inhibit accidental removal of the applicator pad 10 from the attachment member 40. The locking member 52 may be flexible to enable the locking member 52 to be disengaged from the attachment member, for example to enable removal, replacement and/or maintenance of the applicator pad 10.

The attachment member 40 may be flexible or at least a part of the attachment member 40 may be flexible and/or articulated, to enable the position and/or orientation of the applicator pad 10 relative to the actuator to be adjusted, to enable the applicator pad 10 to conform to a surface to which the label 12 is to be applied. It is possible for this adjustment to be made passively, in the event that the applicator pad 10 contacts the surface to which the label 12 is to be applied, or actively, if the labelling apparatus determines that the position or orientation of the surface to which the label 12 is to be applied is different from the current position or orientation of the applicator pad 10. The adjustment of the position and/or orientation of the applicator pad 10 may be made by a combination of active and passive adjustment.

The configuration of the attachment member 40 is such that the adjustment of the position and/or orientation of the applicator pad 10 may be made whilst maintaining the integrity of the airways which flow through the attachment member 40. The configuration of the attachment member 40 may inhibit or prevent rotation of the applicator pad 10 relative to the actuator to avoid misplaced (for example skewed) labels 12.

The engagement formation 36 and the locking member 52 (where provided) may be positioned adjacent and/or substantially aligned with the inlet 24 of the applicator pad 10.

The attachment member 40 may be permanently or semi-permanently fixed to the actuator, for example with screws or similar fixings, or may be integral with the actuator.

Figure 4A:
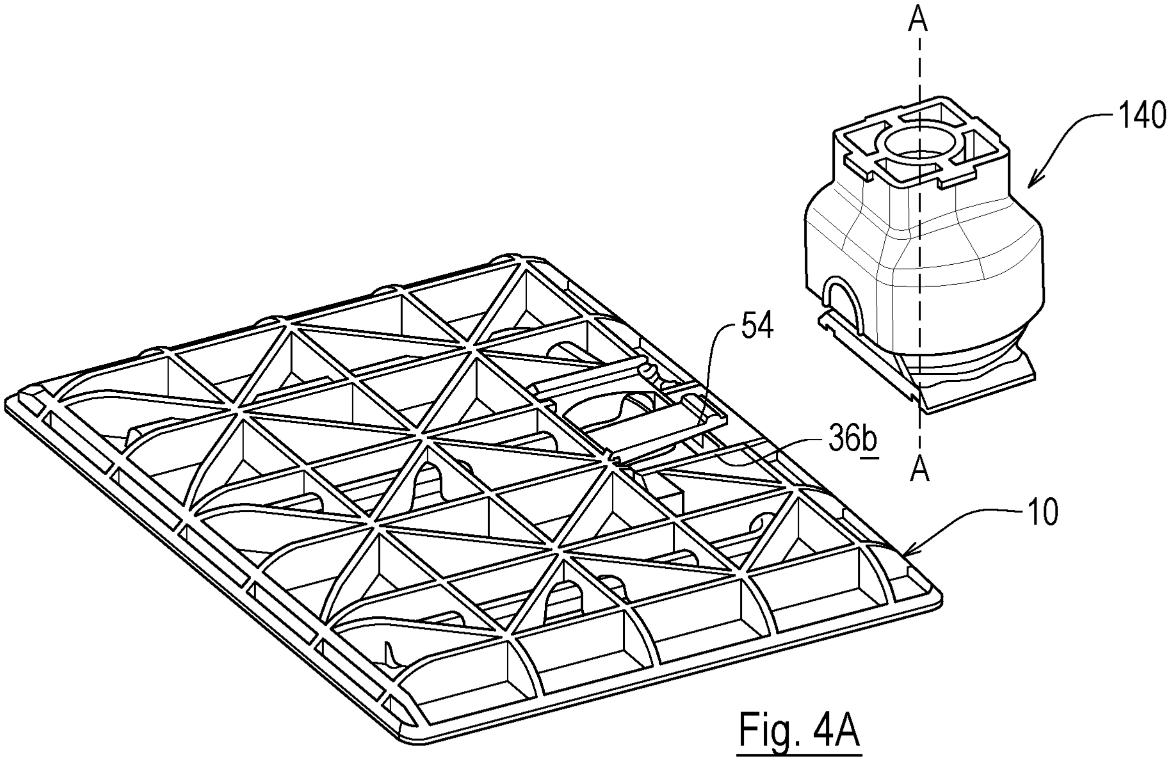
FIG. 4A is an alternative illustrative perspective view of an applicator pad and an associated attachment device for attaching applicator pad to an actuator.
Figure 4B:
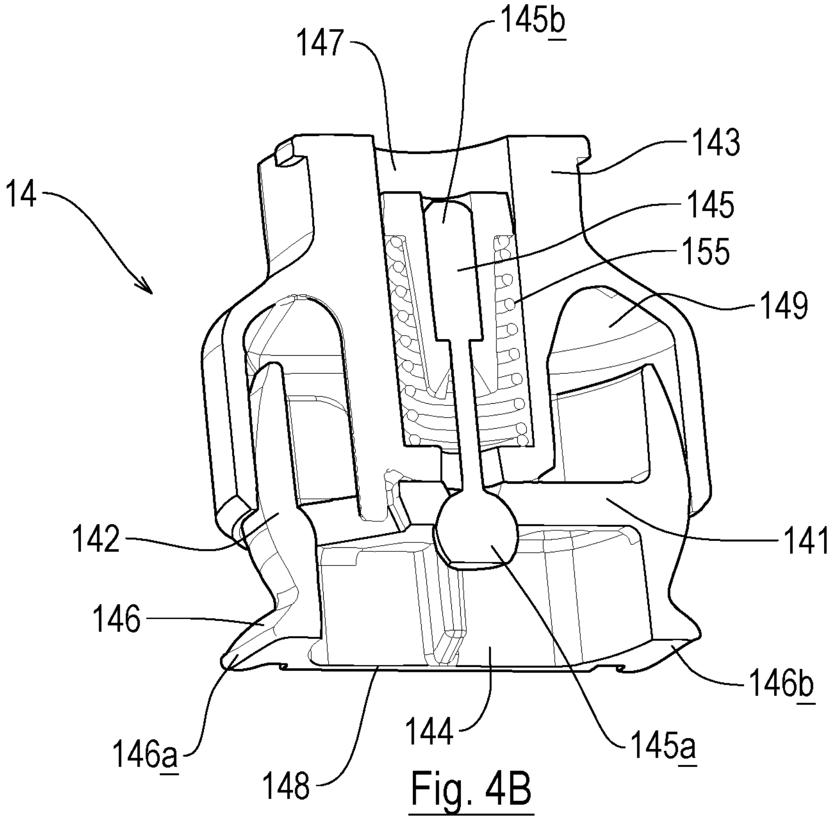
FIG. 4B is a cross-sectional view of part of an attachment device for attaching an applicator pad to an actuator.

FIGS. 4A and 4B show an embodiment of an attachment member 140. Features of the attachment member 140 which are similar to those of the attachment member 40 are denoted with similar reference numerals, with a ‘1’ prefix. The attachment member 140 includes a first part 142 and a second part 143. The attachment member 140 has a substantially longitudinal axis A. The attachment member 140 includes a connecting member 145 which connects the first part 142 to the second part 143 of the attachment member 140.

The first part 142 is a body which includes a base 148, and an engagement member 146. The engagement member 146 may include a pair of protrusions 146*a*, 146*b* which are receivable in the engagement formation 36 of the applicator pad 10. The first part 142 includes an opening 144 through which pneumatic connections may pass. Electronic connections may also pass through the first part, although this is not essential. The first part may include a holding member 141 for holding a part of the connecting member 145. The holding member 141 may be a seat for a part of the connecting member 145. The holding member 141 may include an opening through which a part of the connecting member 145 may pass. An outer surface of the first part 142 may be shaped to be receivable in and moveable relative to the second part 143. A part of the outer surface of the first part 142 may be curved. The external shapes of the first part 142 and the second part 143 may be selected to co-operate with one another. The engagement of the first part 142 and the second part 143 provides a sealing engagement, such that the first part 142 and the second part 143 are fluidly communicable with one another. A pneumatic connection may be maintained by the connection between the first part 142 and the second part 143.

A realignment member 155 may be connected between the second part 143 and the connecting member 145. The realignment member 155 may be a resilient member 155, for example a spring. The realignment member 155 is provided to return the first part 142 and 143 to substantially co-axial alignment in the event of the first part 142 and the second part 143 tilting relative to one another. Where the realignment member 155 is a spring, a spring force may be transmitted through the connecting member 145 to the holding member 142, such that the holding member 141 is maintained in contact with the second part 143 of the attachment member 140. The realignment member 155 exerts the spring force on the holding member 141 in a direction towards the second part 143, in a direction which is substantially normal to the plane of the attachment pad 10, so as to exert a realignment force on the holding member 141, to bring the holding member 141 and the second part 143 of the attachment member into substantially co-axial alignment with one another.

The second part 143 includes a first opening 147. The first opening may extend substantially centrally through the second part 143. The first opening 147 may receive a part of the connecting member 145. The second part 143 includes a second opening 149 in which at least a proportion of the first part 142 of the attachment member 140 is receivable. The second opening 149 may be substantially annular, and may be substantially concentric with the first opening 147, about the axis A. The second opening 149 may be located axially outwardly of the second part 143, relative to the axis A. The second part 143 is configured to be attached to an actuator 180. The second part 143 may include a portion which is manufactured from a resilient material. The second opening 149 may be defined by the portion which is manufactured from a resilient material, to enable the second part to accommodate movement of the first part 142 within the second opening 149.

The connecting member 145 may include a ball element 145*a* and a shaft 145*b*. The shaft 145*b* may extend through the first opening 147 of the second part 143, and through the opening in the holding member 141 of the first part 142.

The first part 142 and the second part 143 of the attachment member 140 may articulate with one another. The attachment member 140 may form a universal joint. The attachment member 140 may enable pivotal and/or rotational movement of the applicator pad 10 relative to the actuator 180.

Different sizes and shapes of the attachment member 40, 140 are possible, for use with different sizes of applicator pad and/or actuator.

Figure 5B:
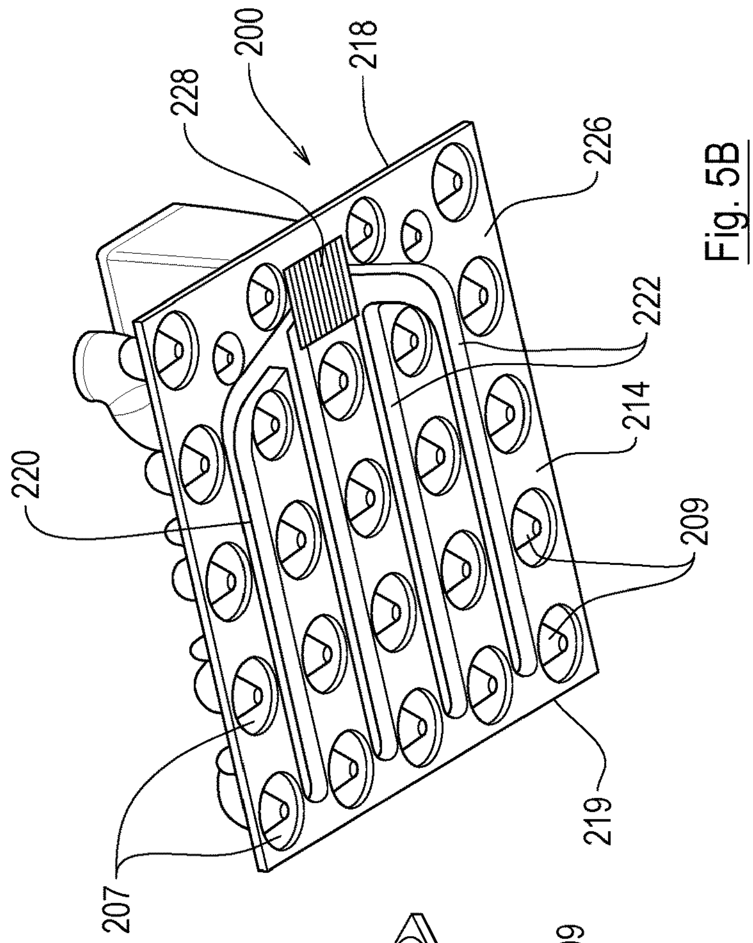
FIG. 5B is an illustrative perspective view of the embodiment of an applicator pad of FIG. 5A, showing a label receiving side of the applicator pad.
Figure 5A:
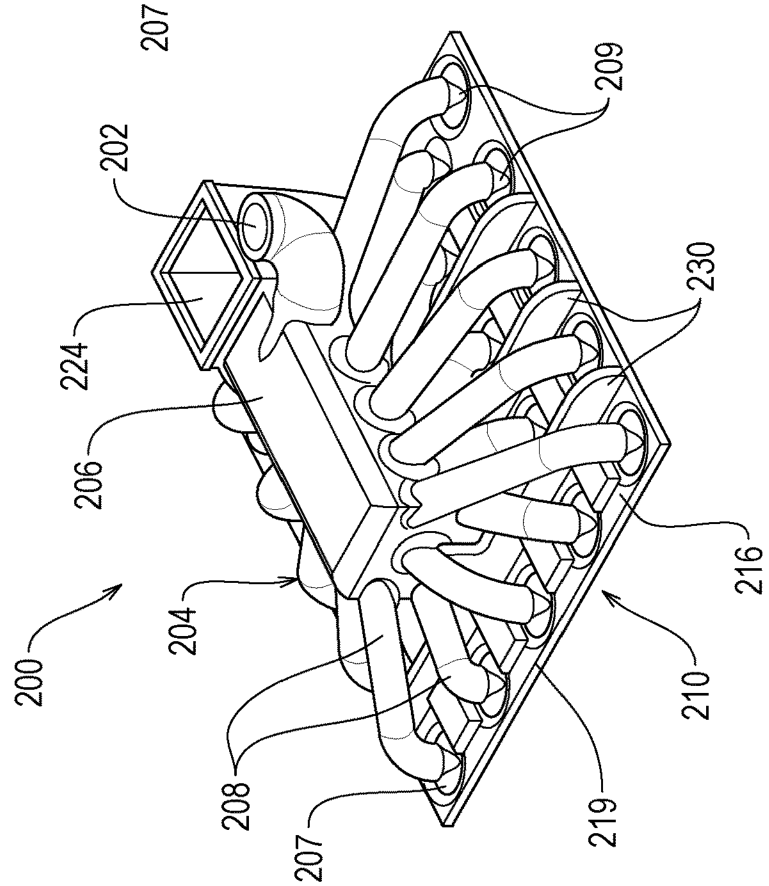
FIG. 5A is an illustrative perspective view of an embodiment of an applicator pad.

An embodiment of an applicator pad 210 is shown in FIGS. 5A and 5B. FIG. 5B shows a first, label receiving side 214 of the applicator pad 200, and FIG. 5A shows a second side 216 of the pad 200. Embodiments of an applicator pad such as the embodiment shown in FIGS. 5A and 5B may be advantageous in circumstances when an impact between the applicator pad 210 and the surface to which the label is to be applied is undesirable, or is not possible, for example if the surface to which the label is to be applied is delicate, or an item beneath the surface to which the label is to be applied is delicate and/or fragile and/or the surface to which the label is to be applied may be uneven. In such situations, it is desirable to apply the label by blowing the label on to the surface to which it is to be applied. It is known to combine a blowing process and a tamping (pressing) process to apply labels.

Referring to FIGS. 5A and 5B, there is shown an applicator pad 210 for a labelling apparatus. The applicator pad 210 has a first side or label receiving side 214 and a second side 216. The applicator pad 210 also has a label entrance edge 218, and an opposite edge 219.

The applicator pad 210 includes a conduit arrangement 220, which in embodiments includes a plurality of conduits 222 one or more of which may be fluidly communicable with one another. The conduit arrangement 220 may also be fluidly communicable with an inlet 224, which may be an air inlet. In embodiments, the inlet 224 may be fluidly communicable with each of the conduits 222. The inlet 224 may be positioned adjacent the label entrance edge 218. For example an edge of the inlet 224 may be located approximately 2-15 mm (preferably approximately 12 mm) from the label entrance edge 218 of the pad 214. The inlet 224 and at least a part of the conduit arrangement 220 may be fluidly communicable with the label receiving side 214 of the applicator pad 210. Fluid, for example air, may be drawn into the applicator pad 210 via at least a part of the inlet 224 and/or at least a part of the conduit arrangement 220. The inlet 224 may have a large cross-sectional area in the plane of the label receiving side 214.

The cross-sectional area of the inlet 224 in a plane substantially parallel to or co-incident with the label receiving side 214 may be dependent upon the size of the applicator pad 210. The inlet 224 may be substantially circular in cross section, or it may be substantially rectangular in cross section, for examples. The cross-sectional area of the inlet 224 in a plane substantially parallel to or co-incident with the plane of the label receiving side 214 may be approximately 240 $mm^2$ for labels larger than 40 mm wide and 30 mm long. The minimum cross sectional area of the inlet 224 in the plane of the label receiving side 214 is 140 $mm^2$. Smaller cross sectional areas of the inlet 224 may deteriorate the air flow thus affecting the label attraction properties. For smaller labels (i.e. labels having dimensions less than 40 mm×30 mm) the cross-sectional area of the inlet 224 may be smaller. The cross-sectional area may be 48 $mm^2$. Ideally the inlet 224 should cover approximately 50% of the small label pad 214.

The purpose of the conduit arrangement 220 and the inlet 224 is to provide a suction or vacuum effect, which is capable of holding the label 12 adjacent the label receiving side 214 of the applicator pad 210, against gravity, for example.

The cross sectional area of each of the conduits 222 may be small relative to the cross-sectional area of the inlet 224, and each conduit 222 may be between approximately 1 mm and approximately 5 mm wide, and may be approximately 2 mm wide, for example. The width of the conduits 222 is selected to ensure that even the thinnest labels do not become distorted in the vicinity of the conduits 222.

The cross-sectional area of the inlet 224 in the plane of the label receiving side 214 may be dependent upon the size of the applicator pad 210. The cross-sectional area of the inlet 224 may be greater than or equal to 135 $mm^2$ for 'standard' sized applicator pads, but may have a smaller cross-sectional area for applicator pads 210 which are produced for the application of small labels. The applicator pad 210 may include one or more guard ribs 228 which extend across at least a part of the inlet 224. The or each guard rib 228 may extend in a plane which is substantially perpendicular to the plane of the applicator pad 210 and hence substantially perpendicular to the cross-section of the inlet 224. The or each guard rib 228 may inhibit labels and/or foreign objects entering (for example being sucked into) the inlet 224.

In embodiments, the conduit arrangement 220 may include four conduits 222, for example (as shown in FIG. 5B). More or fewer than four conduits 222 may be provided. The or each conduit 222 may include a substantially straight portion. A part of one or more of the conduits 222 may extend away from the label entrance edge 218 of the applicator pad 210, towards the opposite edge 219. The substantially straight portion of the or each conduit 222 may extend away from the label entrance edge 218 of the applicator pad 210, towards the opposite edge 219. Where the conduit arrangement 220 includes a plurality of conduits 222, corresponding portions of two or more of the plurality of conduits 222 may be parallel with one another.

The applicator pad 210 includes an opening or port 202. The port 202 may be near to or adjacent the inlet 224. Fluid, for example air, may be supplied to the applicator pad 210 through the port 202, for example from an external fluid source, for example an air compressor.

The applicator pad 210 may include a distribution arrangement 204. The distribution arrangement 204 may include a distribution chamber 206 which may be fluidly communicable with the port 202. The distribution arrangement 202 may include one or more distribution conduits 208, each of which may be fluidly communicable with the distribution chamber 206 and/or the port 202. The applicator pad 210 may include a nozzle 209 or a plurality of nozzles 209, each of which may be associated with a respective distribution conduit 208. The or each distribution conduit 208 may terminate in a respective nozzle 209. The or each distribution conduit 208 may include one or more curved portions. The or each curved portion may have as large a bend radius as space will allow, to optimise fluid flow through the or each distribution conduit 208.

The or each nozzle 209 includes a small aperture, which acts as a fluid outlet. The or each nozzle 209 may have the smallest cross-sectional area, of the distribution arrangement 204. The total cross-sectional area of the nozzles 209 may be smaller than any of a fluid delivery path which extends between the fluid source and the nozzle, via the port 202, the distribution chamber 204 and the or each distribution conduit 208. The total cross-sectional area of the nozzles 209 may be smaller than the smallest cross-sectional area of any other part of an air flow path, between the fluid source and the nozzles 209. Providing the smallest cross sectional area at the or each nozzle provides high speed fluid flow at the or each nozzle 209, which may optimise thrust, to move the label 12 away from the label receiving side 214 of the applicator pad 210. The speed of the fluid leaving the or each nozzle 209 may be ultrasonic.

The applicator pad 210 includes one or more openings 207, each of which is associated with a respective nozzle 209. The or each opening 207 may surround the respective nozzle 209. The or each nozzle 209 may be substantially centred in the respective opening 207. The or each opening 207 may have a large cross-sectional area relative to the respective nozzle 209. The diameter of the or each opening 207 may be approximately 11 mm. The or each opening 207 may enable air, for example ambient air, to be drawn into the applicator pad 210. Air may be drawn through the applicator pad 210 via the or each opening 207. This inhibits labels 12, 13 from sticking to the pad during application to a surface, and improves the efficiency of the 'blow' process. The openings 207 inhibit the formation of a vacuum between the label 12, 13 and the applicator pad 210, which is important during a blow process, but which is not relevant when tamping a label on to the surface to which the label is to be applied. The cross-sectional area of the or each opening 207 may be optimised to ensure that the air flow effect is sufficient, but that there is sufficient material of the applicator pad 210 remaining to provide space and/or support for the or each distribution conduit 208 and/or the distribution chamber 204.

The conduit arrangement 220 and/or the inlet 224 enables labels 12, 13 to be attracted towards the applicator pad 210 without the need for additional directional air jets, for example external air jets, or other form of directing apparatus which are required to guide the labels towards the applicator pads of known label applicator systems.

The applicator pad 210 may include an engagement formation which is engageable with an attachment member which may be similar to or the same as the attachment member 40 as described above. The applicator pad 210 may be attachable to an actuator which may be the same as or similar to the actuator 180 described above and/or as shown in the drawings.

The configuration of the applicator pad 210 is complex, and may not be achieved with known moulding processes. Therefore, the manufacture of the applicator pad 210 may include an additive manufacturing process.

The label receiving side 214 of the applicator pad may include a portion having a structure, which may be a roughened surface, which has the effect of reducing the contact surface area between the label receiving side 214 and the label 212. The portion 226 may be similar to or the same as the portion 26 of the applicator pad 10 described above, and may have any or all of the features of the portion 26.

The second side 216 of the applicator pad 210 may include one or more stiffening ribs 230. The ribs 230 may be provided in a grid arrangement, for example, or another advantageous arrangement, for example a honeycomb, or triangular arrangement. The arrangement of the ribs 30 may be selected to provide optimum torsional stiffness. The arrangement of the ribs 230 may be configured in accordance with the position of the or each distribution conduit 208 or some of the distribution conduits 208, and/or the distribution chamber 206. The or each rib 230 may have any or all of the features of the or each rib 30 of the applicator pad 10.

In order to facilitate the manufacture of embodiments of the applicator pad 10, a parametric computer aided design (CAD) model may be provided to create instructions for an additive manufacturing method. Entering the desired applicator pad width W and length L into the model will generate instructions to produce all of the features of the applicator pad 210. It may be possible for a designer to select whether to include optional features.

In use, a label 12 is transported away from a printhead of a printing apparatus, typically by motor-driven spools which wind a carrier web 15 bearing a series of labels 12, 13 in the required direction, and each label 12, 13 is separated from the carrier web 15, for example by a peel-off roller. As the label 12 is removed from the carrier web 15, the label 12 travels towards the label entrance edge 218 of the applicator pad 210. The leading edge 12*a* of the label 12 is separated from the carrier web 15 before the trailing edge 12*b*, and the leading edge 12*a* of the label 12 engages with the label receiving side 214 of the applicator pad 210 before the trailing edge 12*b* of the label 12 has been separated from the carrier web 15.

As the label 12 moves across the label receiving side 214 of the applicator pad 210 in the direction of arrow B, at least a part of the label 12 covers an increasing proportion of the inlet 224 of the applicator pad 210. As the inlet 224 is covered, air is then sucked through at least a part of the conduit arrangement 220. As the label 12 continues to travel in the direction of arrow B, the conduit arrangement 220 is progressively covered, and air is then sucked through an uncovered part or parts of the conduit arrangement 220. This arrangement means that as the label 12 moves across the applicator pad 210, the effective air inlet (i.e. the part or parts of the air inlet 224 and/or the conduit arrangement 220 which is/are uncovered at a given moment) moves further away from the label entrance edge 218 of the applicator pad 210. This enables the transfer of labels having a range of sizes by the same applicator pad 210. The largest label 12 which can be handled by the applicator pad is determined by the physical size of the applicator pad 210, and the smallest label size may be defined by a rectangular area defined by the outermost conduits 220 and may be approximately two thirds of the length (measured from the label entrance edge 218 towards the opposite edge 219) and two third of the width W (symmetric about a centreline of the applicator pad 10) of the label receiving side 214 of the applicator pad 210. Alternative arrangements of the applicator pad 210 and the conduit arrangement 220 may be selected, and the optimum arrangement may be selected based upon the size of the labels intended to be printed by the printing apparatus with which the applicator pad 210 is intended to be used.

The applicator pad 210 is manoeuvred into the desired position to apply the label, by an actuator, which may be the same as or similar to the actuator 180. The distance between the applicator pad 210 and the item to which the label is to be applied may be between approximately 0 mm and approximately 100 mm, for example, but more typically between approximately 0 mm and approximately 20 mm. The smaller the distance between the label 12 and the surface to which the label is to be applied, the greater the positional accuracy when placing the label.

Fluid, typically air, is introduced to the applicator pad 210, via the port 202, and may be forced through the or each nozzle 209, for example via the distribution chamber 206 and/or the of each distribution conduit 208. The movement of fluid through the or each nozzle 209 pushes the label 12 away from the label receiving side 214 of the applicator pad 210 towards the surface to which the label is to be applied. The label 12 may be applied to the surface without a tamp process, i.e. the blow process may be sufficient to cause the label 12 to adhere to the surface in a desired position.

It will be appreciated that there may be situations where a tamp process is acceptable, but where as light an impact force as possible is desirable. There may also be situations where the ability to apply a variable impact force is desirable.

It is desirable to apply labels with a controlled and/or repeatable impact energy and/or impact force. It may also be desirable to have a short 'cycle' time, in other words, to make the time taken to apply each label as short as possible.

A labelling apparatus includes an applicator pad (which may or may not be similar to or the same as the applicator pad 10, 210) for receiving a label 12, 13 from a printing apparatus, an actuator (which may or may not be similar to or the same as the actuator 180) to which the applicator pad is attached, for enabling movement of the applicator pad. The actuator may include a first motor 301. The motor 301 may be coupled to the actuator via a drive belt 302 which converts rotary motion of the motor 301 to linear motion of the actuator 180, 400, 500. A drive belt tensioner 304 may be provided to maintain an acceptable tension in the drive belt 302.

A control system for controlling the movement of at least a part of a labelling apparatus may be provided. The control system may include a motor control system. The motor control system may include a first motor (e.g. 301) for controlling movement of an actuator (e.g. 180, 400, 500) which may enable movement of an applicator pad. The applicator pad may be similar to or the same as the applicator pad 10, 210, and or may include features of either or both of the applicator pads 10, 210.

The motor control system may include a closed-loop control system. The motor control system may include a position encoder mounted on a part of the first motor, for example on a rotor of the first motor. Closed-loop motor control may be achieved using sensor-less motor control technology, for example such as technology provided by Microbeam SA.

Figure 6:
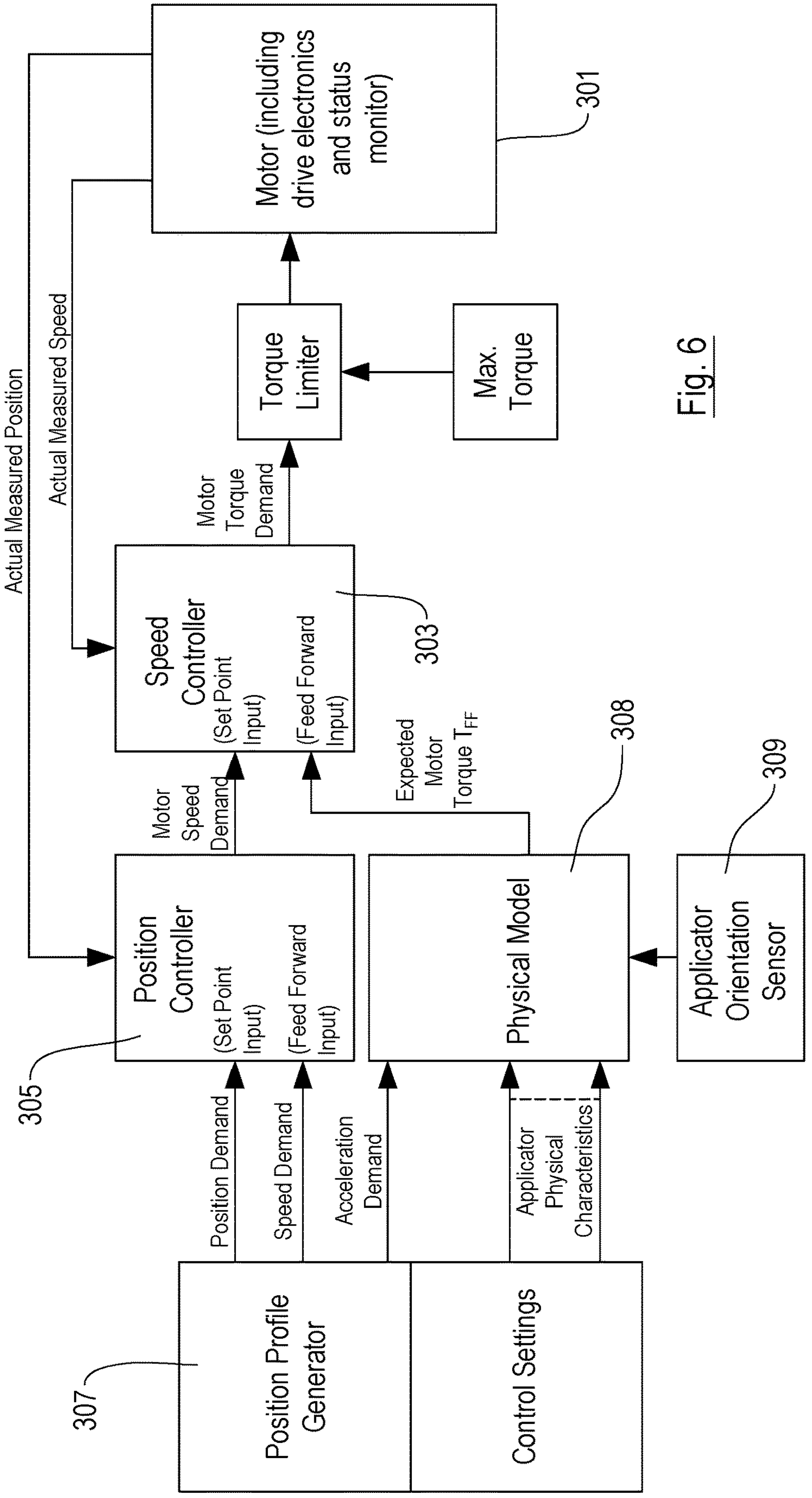
FIG. 6 is a process diagram, illustrating a control system for a part of a labelling apparatus.

FIG. 6 shows a process diagram for the actuator motor control process. The controller is typically implemented in a microprocessor with the functionality implemented by the microprocessor software.

The motor 301 may include a stepper motor, and may include the motor itself as well as driver electronics to operate the motor 301. It will be appreciated that similar functionality can be achieved using other electric motor types, for example a brushless DC motor or a servo motor. The motor control system enables rotor speed and position monitoring. Such monitoring may be provided as part of a 'sensorless' drive system. For other types of motor this may be derived from a rotary encoder mounted on the motor, for example. A position profile generator 307 specifies in real time a required position of the applicator pad 10, 210. A corresponding required position and speed of the actuator 180, 400, 500 are fed to a position controller 305, which may be a closed-loop proportional controller, which uses knowledge of the current applicator position to create a speed demand for the motor 301.

The motor control system is configured so it knows the physical parameters of the actuator 180, 400, 500 and pad 10, 210 system; this includes the inertia of all moving components and the expected friction of bearing surfaces.

The physical embodiment of the motor control system may also include a gravity related component. The actuator 180, 400, 500 can operate in any orientation, so the motor control system may include a gravity sensor to determine the operating plane of the actuator 180, 400, 500. The motor control system can then compute the expected torque the motor 301 shall deliver using standard physical model techniques. The expected torque is indicated to a speed controller 303, which may be a closed loop Proportional/Integral controller, where it is combined with the speed demand signal to generate the motor torque demand signal which is fed to the motor itself. The use of the theoretical torque signal combined with the speed demand allows the actuator respond more quickly and precisely meaning the actuator follows the desired path more closely.

It is well known in the motor control field, when using closed loop control, that there is always a slight error between the desired speed/position and the actual speed/position. It is also known that a closed loop control system will overshoot its target speed/position. This technique reduces the error and overshoot.

Figure 7:
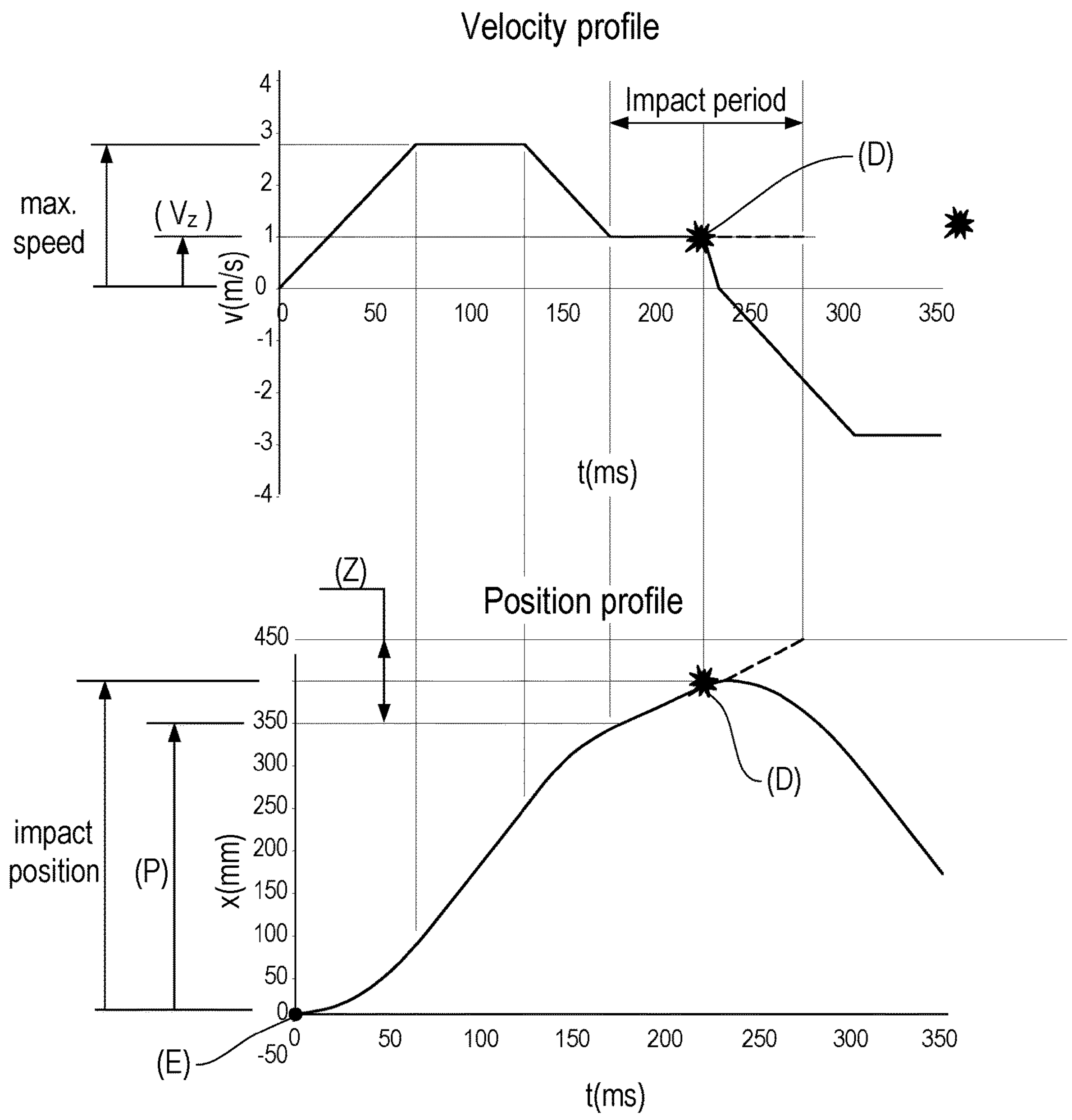
FIG. 7 is a velocity profile and an associated position profile of an actuator and applicator pad of a labelling system.

FIG. 7 shows a velocity profile and a position profile of an applicator over the course of a single label application operation.

When the applicator pad has received a label 12, 13 to be applied, the motor control system controls the first motor to move the actuator, and hence the applicator pad and the label 12, 13 towards a desired position adjacent the surface to which the label 12, 13 is to be applied, i.e. a first potential impact point P, the value of point P being measured as a distance from a rest position E along a motion axis of the applicator. The motor control system may move the applicator pad as quickly as possible, from the rest position E to the point P. The applicator pad arrives at the point P at a speed V. The speed V may be adjustable. The speed V may be the desired impact speed of the applicator pad against the surface to which the label 12, 13 is to be applied.

The first motor 301 may be controlled in a position-control mode, in which the speed of the first motor 301 is determined by the position of the applicator during its movement between the rest position E and the point P. The speed profile of the applicator pad may be set dependent upon the moving mass of the applicator (plus the moving parts of the actuator) and the torque which may be provided by the first motor 301. The speed profile may be optimised to enable the distance between the rest position E and the point P to be covered in a minimum time period. The distance between the rest position E and the point P may be a distance which is predetermined (i.e. set) and configured in the motor control system, or may be obtained from a sensor which measures the position of the applicator pad relative to the surface to which the label is to be applied (i.e. the target). A suitable sensor may be an ultrasonic distance sensor, which may be triggered by an optical sensor.

An impact zone Z may be defined as the range over which the applicator may impact the surface on which the label is to be applied. Depending on the packages being labelled and the package handling system in use there will be a range of potential impact points. Within the impact zone Z, the motor control system preferably maintains a substantially constant speed $V_Z$ of the applicator pad. $V_Z$ may be the speed V at which the applicator pad reaches the point P. Control parameters of the motor control system whilst the applicator pad is located within the impact zone Z may be different from the parameters applied to move the applicator pad from the rest position E to the point P. The parameters may be different in any or all of the following ways: a reduced controller stiffness, the motor control system may operate in an open-loop configuration, the motor control system may operate in a torque control mode, the motor control system may operate in accordance with a model-based feed-forward algorithm, for example to avoid a sharp increase of the motor force upon impact of the applicator pad with the target surface (which is envisaged if the motor control system is operated in accordance with a position control algorithm). An aim of the control system is to maintain the speed $V_Z$ of the applicator pad, whilst applying a low impact force, for example a minimum impact force which is capable of applying the label 12, 13 to the target surface. An aim is to achieve one or more of the following objectives: minimising the contact time between the applicator pad and the target surface, avoiding bouncing of the applicator pad on the target surface, and/or avoiding an application of an increased force as a result of increased motor torque during or after (for example immediately after) impact. It is possible to achieve a very soft impact by virtue of this method.

The control system may detect the impact (at an impact position D) between the applicator pad and the target surface. The control system may monitor one or more of the following impact detection parameters or a combination of two or more of the following parameters: an increase in the motor current, a deviation from the impact speed $V_Z$, an increase in a position error (i.e. a difference between a target position and a measured position).

When the impact is detected, the motor controller is switched back to position control mode, which may be a 'stiff' position control mode, with the target position being the impact position D, to dissipate the momentum of the first motor 301 and the transmission.

A delay may occur (which may be predetermined), during which the label 12, 13 is applied to the target surface, before the control system moves the actuator to move the applicator pad away from the target surface, back towards the rest position E to receive a further label 12, 13. The control system may be operated in a position control mode, for example with an optimised motion profile to minimise the travel time between the impact position D and the rest position E. The motor control system may operate in a similar mode to that outlined above in relation to the movement of the applicator pad between the rest position E and the point P.

The label application force may be adjusted, for example by adjusting the impact speed $V_Z$ and/or by modifying one or more of the impact detection parameters as set out above, and/or by modifying a combination of two or more of the impact detection parameters.

The label application process can be performed repeatedly, so as to apply one or more labels to each of a series of items, for example packages in a production line. As each item approaches the vicinity of the applicator, the position of the item is determined, for example by the position sensor, which enables the impact zone Z associated with each item to be determined. Thus the impact zone Z for each item may be determined dynamically during operation of the applicator apparatus, to enable accurate control of the applicator apparatus.

A labelling apparatus may include an actuator, for enabling movement of an applicator pad towards a surface to which a label is to be applied.

Typical actuators for labelling apparatus are either pneumatically or electrically operated. 'Off-the-shelf' actuators, which may be manufactured from aluminium and/or steel are typically used in labelling apparatus to move the applicator pad towards and away from the target surface (i.e. the surface to which a label is to be applied) and may be used to apply labels to the target surface. Known actuators are typically bulky and or heavy, which tends to affect movement speeds, and inertia of the actuator and hence the applicator pad (which is attached to a part of the actuator).

Figure 9:
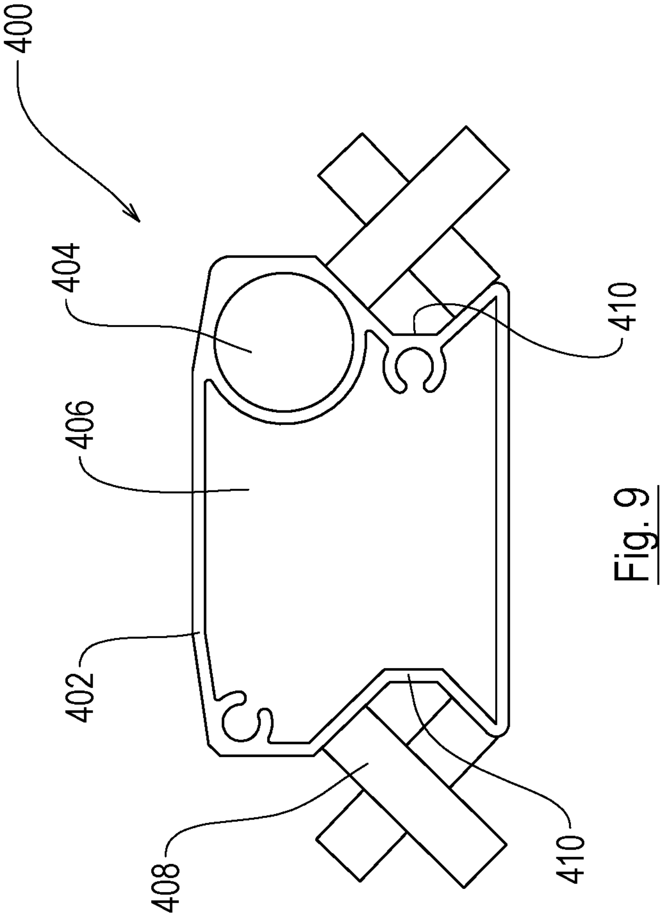
FIG. 9 is a cross-sectional view of the part of the actuator of FIG. 8.
Figure 8:
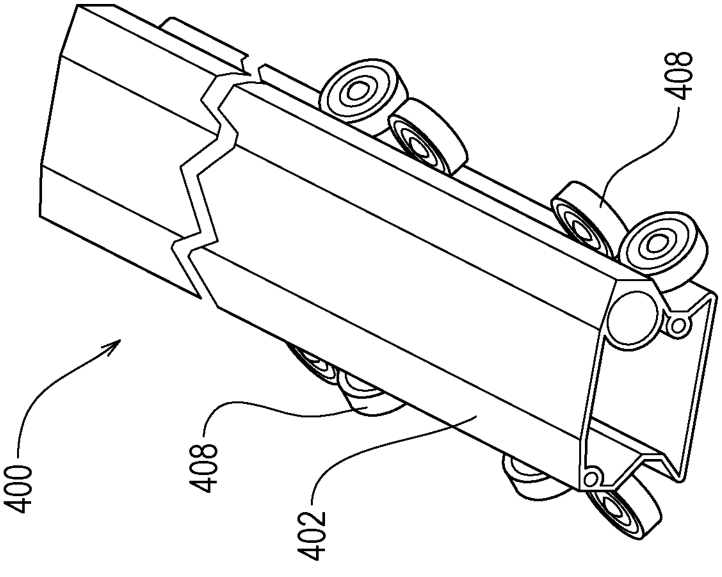
FIG. 8 is an illustrative perspective view of a part of an actuator.

An example of a part of a linear actuator 400 in accordance with embodiments of the invention is shown in FIGS. 8 and 9. The actuator 400 includes a first arm 402. The first arm 402 may be substantially hollow. The first arm 402 may be extruded. The first arm 402 may be manufactured from lightweight material(s), for example aluminium alloy, plastic, fibre-reinforced plastic or a pultruded composite. The first arm 402 may have a cross-sectional shape which is configured to provide mechanical robustness and/or stiffness. The first arm 402 may be manufactured as a tube or tubes.

The first arm 402 may have a shape, for example an internal shape, which is effective in guiding fluid, for example air which is used to hold and/or apply a label. The arm 402 may include a first passage 404 through which fluid, for example compressed air, may travel, for example towards an applicator pad which may be attached to the arm 402, to blow a label 12, 13 away from the applicator pad towards a target surface. The applicator pad may have any or all of the features of the applicator pad 10, 210. The arm 402 may have a second passage 406 through which fluid, for example air, may travel, for example away from the applicator pad, so as to provide suction to hold a label against the applicator pad prior to application of the label 12, 13 to the target surface.

The arm 402 may have a shape, for example an external shape, which is configured to engage with one or more guide members 408. The or each guide member 408 may be a wheel, roller or bearing, for example. The arm 402 may include a track portion 410 for receiving the or each guide member 408. The track portion 410 may be a formation in an external surface of the arm 402.

The actuator 400 may include a second arm 403. A part of the first arm 402 may fit inside the second arm 403, such that the actuator 400 includes a telescopic part. The second arm 403 may include any or all of the features of the first arm 402.

The applicator pad (for example the applicator pad 10, 210) may be attached to the first arm 402 or the second arm 403, in other words to the inside arm or the outside arm.

The actuator 400 is mounted to and/or supported by a body 422 which may be a part of the labelling apparatus and/or another part a production/packaging line, for example a printing apparatus. One or more bearings 424 may be provided to enable movement between the body 422 and a part of the actuator 400, for example the first arm 402. The or each guide member 408 may engage with a part of the body 422 and or one or more of the or each bearing 424.

Air supply components 420, for example fans, valves, etc., are carried by a static part of the actuator 400, to maintain low mass of the moving part(s) of the actuator 400. In embodiments, the air supply components 420 may be attached to, carried by or housed by the first arm 402 or the second arm 403.

The air supply components 420 may be attached to, carried by or housed in the arm 402, 403 which is attached to the body 422.

Figure 11:
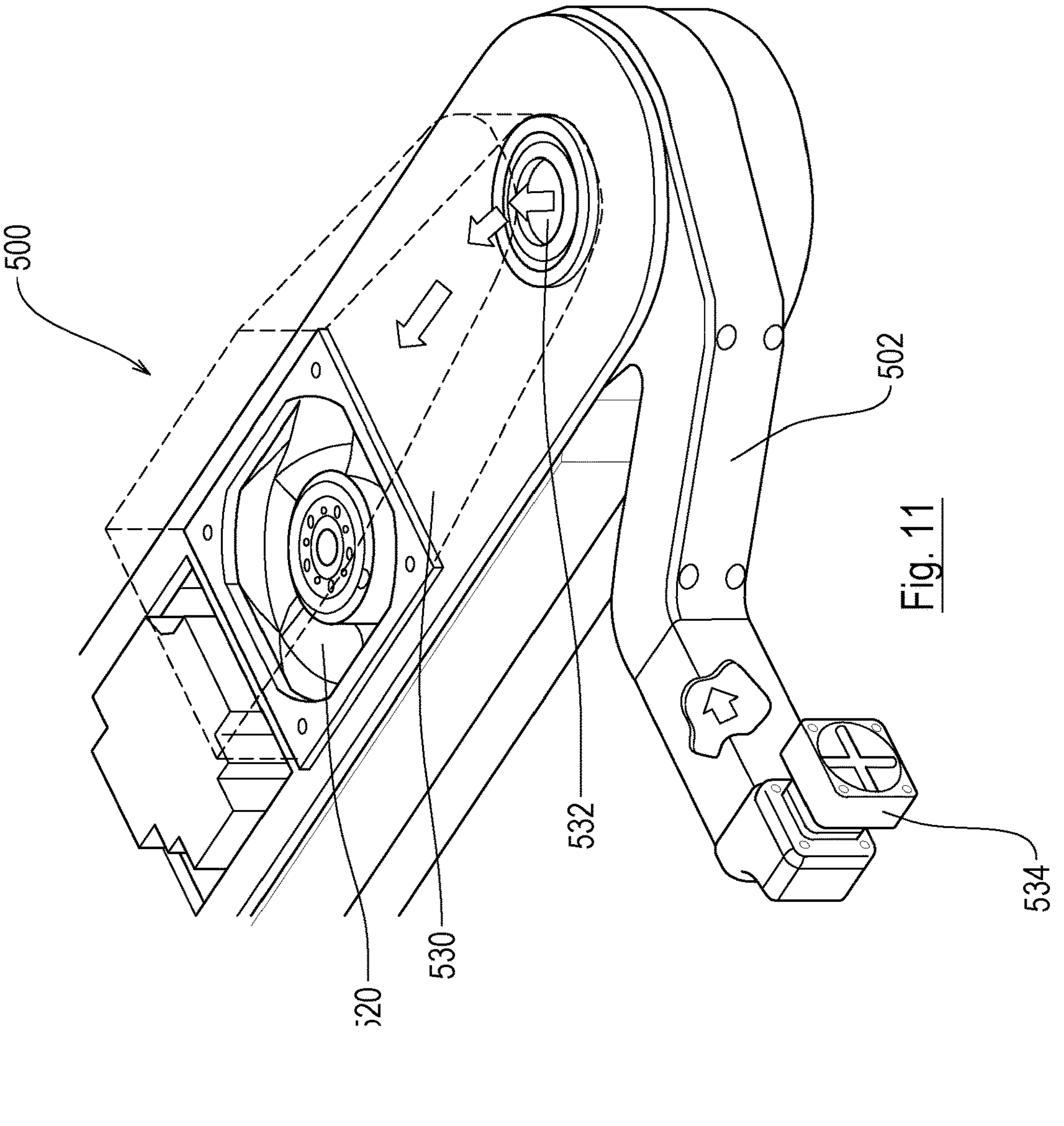
FIG. 11 is an illustrative perspective view of a part of an alternative actuator.

An alternative embodiment of an actuator in accordance with embodiments of the invention is shown in FIG. 11, for example. The actuator 500 may be a rotary actuator. The actuator 500 includes a body 530. The body 530 may be a static part of the actuator 500 and may be attached to, carried by or housed by a part of the labelling apparatus and/or another part of a production/packaging line, for example a printing apparatus. Air supply components 520, for example fans and/or valves, may be attached to, carried by or housed by the body 530.

The arm 502 may carry an applicator pad, for example an applicator pad 10, 210. The applicator pad may be attached to an attachment member 534.

The arm 502 may include any or all of the features of the arm 402. The arm 502 may be manufactured from lightweight materials, for example aluminium alloy, plastic, fibre-reinforced plastic, and/or pultruded composite.

Figure 10:
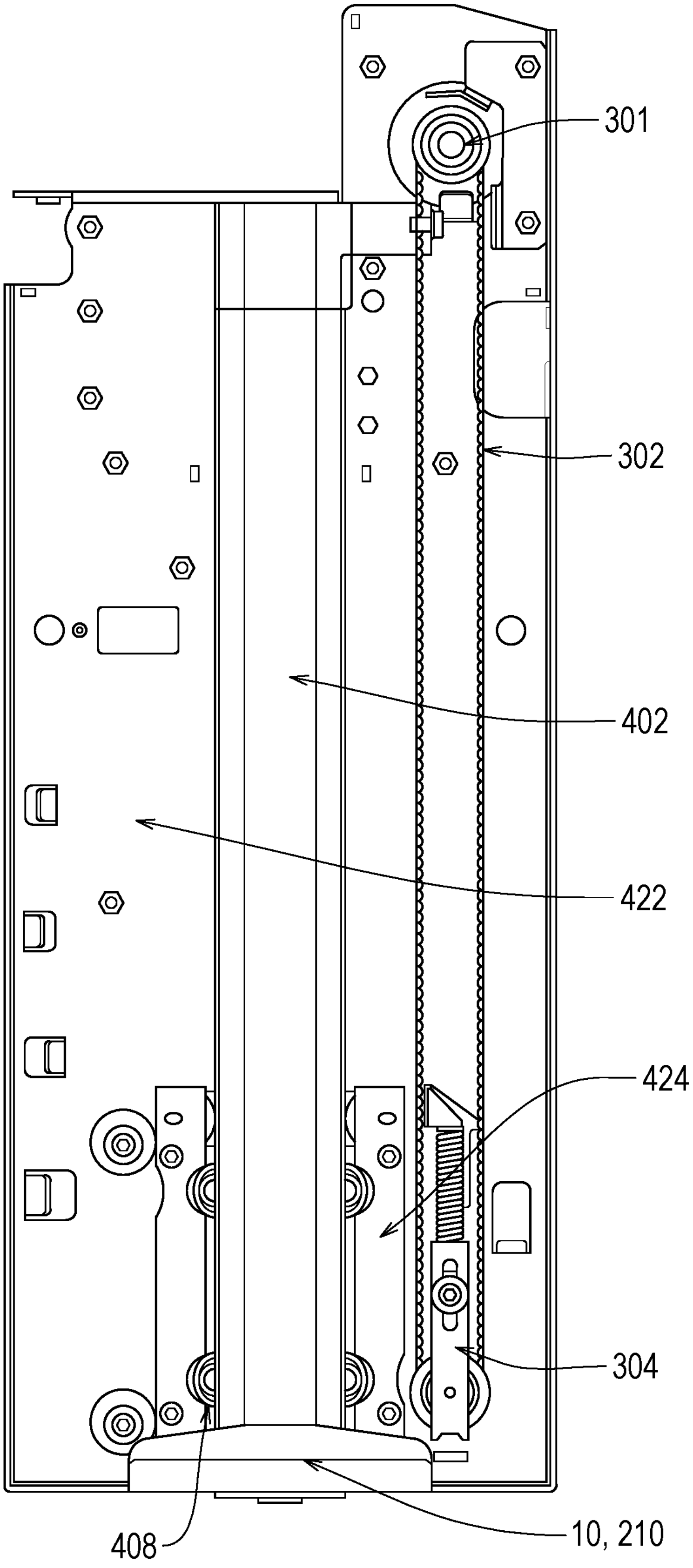
FIG. 10 is an illustrative cross-sectional view showing the actuator of FIGS. 8 and 9 attached to a part of a printing apparatus.
Figure 12:
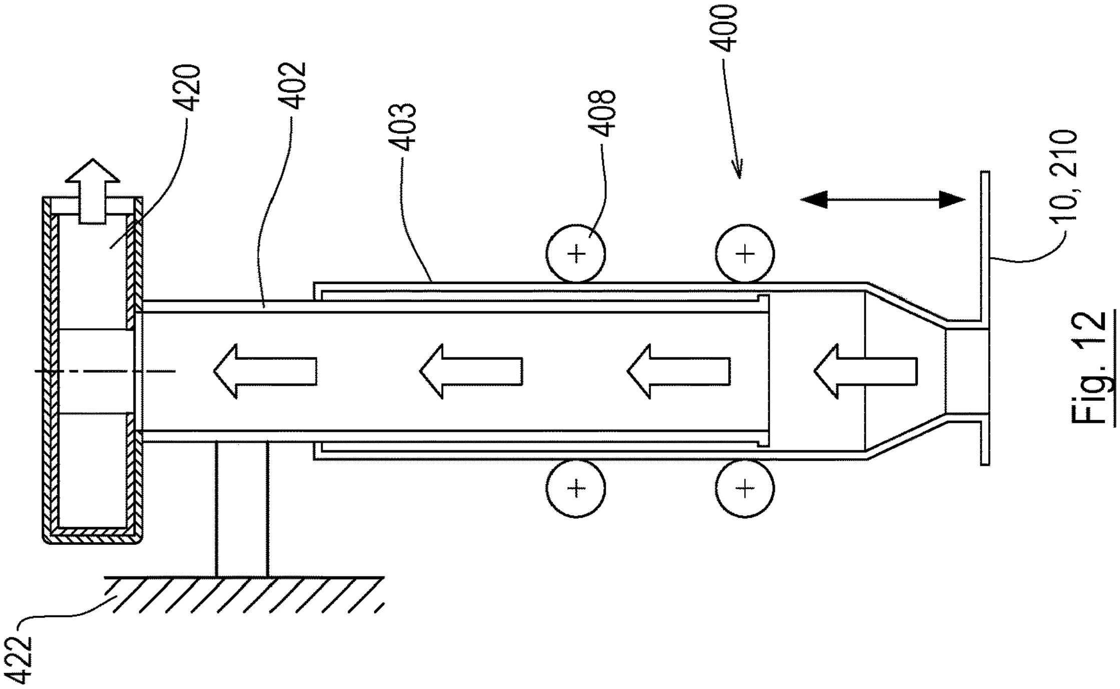
FIG. 12 is an illustrative cross-sectional view of an actuator.

The actuator 500 also includes an arm 502 which may be pivotably attached to the body 530. The arm 502 may be attached to the body 530 by a rotary union 532. The rotary union 532 may provide fluid communication between the body 530 and the arm 502, to enable the flow of fluid, for example air (for example as shown by arrows in FIG. 10) to hold a label 12, 13 adjacent the applicator pad.

The actuator 180, referred to above, may include any or all of the features described in relation to the actuator 400, 500. The actuator 180, 400, 500 may be used in combination with any or all of the other features of the labelling apparatus described herein.

An advantage of the actuator 180, 400, 500 is that it is lightweight, resulting in very low inertia compared to existing actuators. This enables high speed movement of the actuator 180, 400, 500 (and therefore the applicator pad) resulting in a quicker labelling process. Furthermore, the actuator 180, 400, 500 consumes less energy to carry out a label application process as a result of its lightness. The reduction of the moving mass compared to known actuators enables the use of smaller, high-torque motors with low inertia, for example stepper motors. A single motor may be used to drive the arms 403, 502, for example by means of a toothed belt, which may provide a low inertia transmission. A motor rotor position sensor which may form part of the motor control system will have a direct relationship to the position of the applicator pad, enabling the motor rotor position sensor to be used as a position sensor providing actuator/pad position feedback to the applicator control system. The motor rotor position sensor may be a rotary encoder attached to the motor or it may be part of a sensorless drive system such as that manufactured by Microbeam SA. The actuator 180, 400, 500 is robust—there is no mobile cabling and/or pneumatic tubing, for example. The ability to include the air flow generator as a part of the applicator apparatus, for example on a part of the actuator 180, 400, 500, means that it is not necessary to utilise pressurised air from a factory-based compressor (i.e. “factory air”). The air flow generated and/or used in the applicator apparatus may be provided at a low pressure, for example up to 1000 Pa, which is significantly lower than typical “factory air” pressures, which may be in the region of 10 bar or 1 MPa, and have to be transferred to the applicator apparatus from a remote compressor (or other generator). The applicator apparatus of the present invention does not require connection to a separate air compressor, and so it may be used in any setting as required. It does not have to be compatible with any existing pneumatic arrangements which may already be present in the location where the apparatus is installed. The actuator 180, 400, 500 is safe, as a result of low static force and low kinetic energy of any moving components. The actuator is capable of providing a controlled impact—from a very soft impact (low force, e.g. 5 N) to a very high impact (large force, e.g. 50 N, but potentially as high as 150 N, although such a high force is unlikely to be required in practice). An ideal impact force may be 18 N. Known actuators are not capable of such soft or controlled impacts owing to their mass, and hence their inertia.

The actuators 180, 400, 500 may be used in combination with any of the applicator pads described herein and/or shown in the Figures.

It is desirable to be able to determine when a label is adjacent an applicator pad of a labelling apparatus. In known labelling apparatus, proximity sensors are typically mounted on the applicator pad, to detect the presence of a label. Existing label sensors typically use an optical detector system which includes an optical emitter/detector arrangement, wherein the detector detects light emitted from the emitter which has been reflected by a label. This is a costly option since it is necessary to provide flexible electrical connections to the moving end of the actuator.

Figures 13A, 13B:
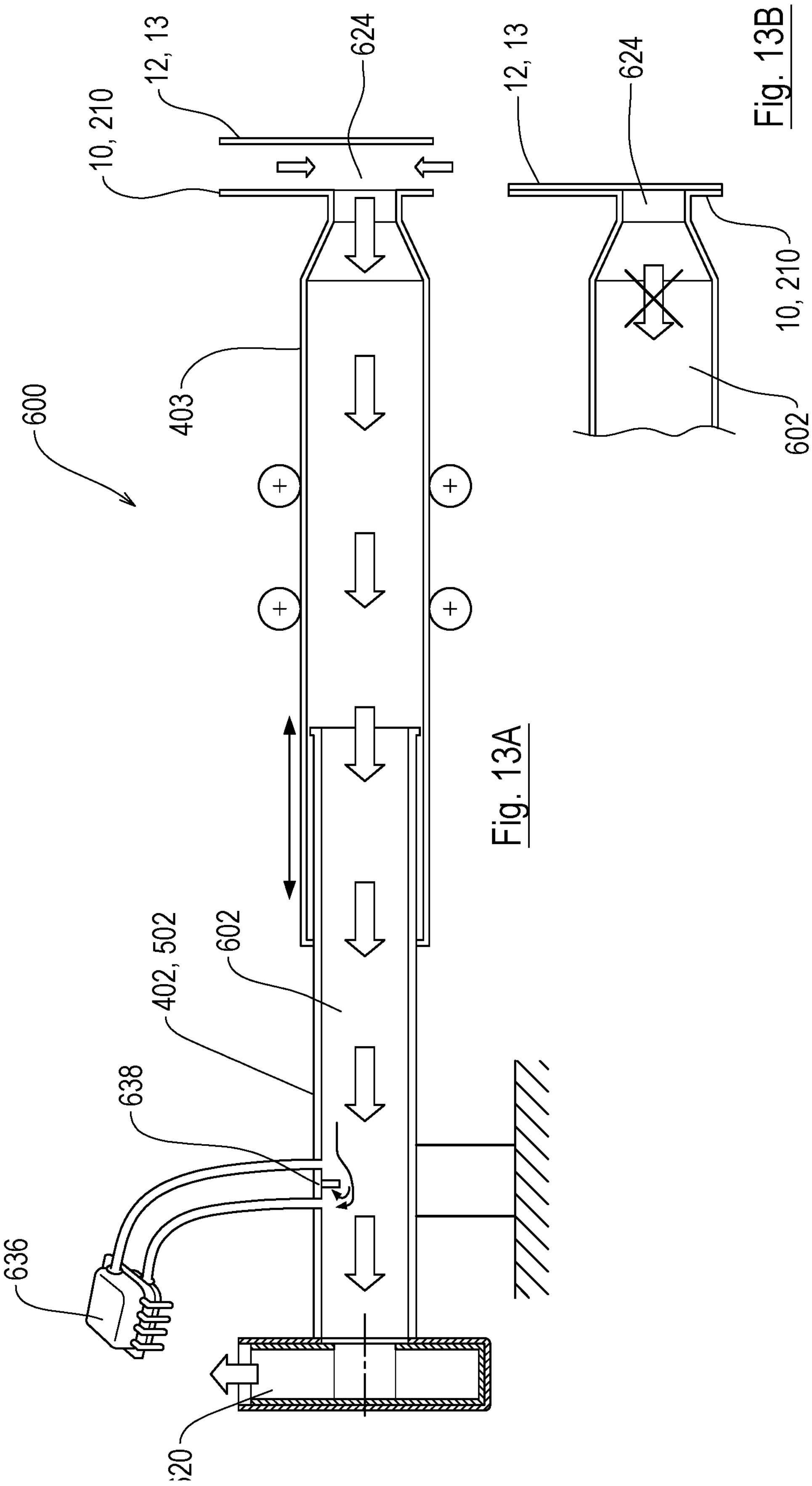
FIG. 13A is an illustrative cross-sectional view of a label detection apparatus, with no label adjacent the applicator pad.
FIG. 13B is an illustrative cross-sectional view showing part of the label detection apparatus, with a label adjacent the applicator pad.
Figure 14:
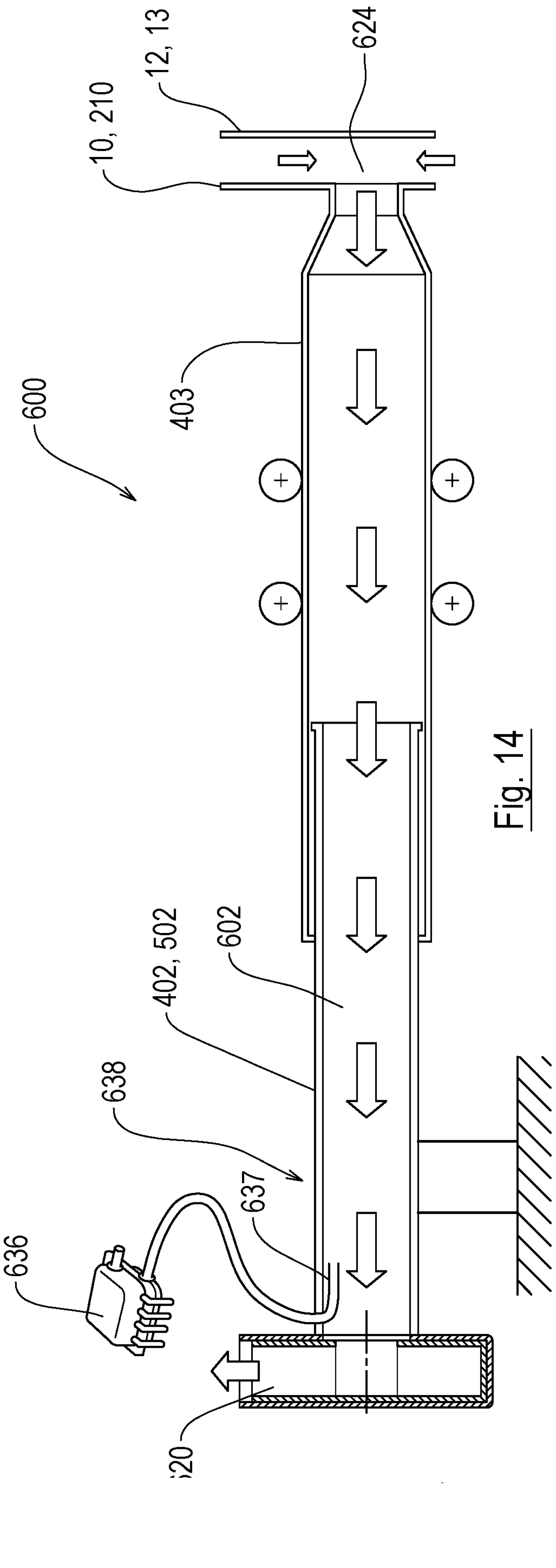
FIG. 14 is an illustrative cross-sectional view showing part of an alternative embodiment of the label detection apparatus.

FIGS. 13A and 13B show an embodiment of a label detection apparatus 600, which may be used in a label detection method. It will be understood that the label detection apparatus 600 and method may be used in conjunction with any appropriate actuator and/or applicator pad.

The label detection apparatus 600 includes an air flow generator 620, for example a fan. Other sources of air flow may be used. The air flow generated by the air flow generator 620 creates suction which holds a label 12, 13 adjacent the applicator pad 10, 210. Other types of applicator pad may be used, however the features of the applicator pad 10, 210 may be advantageous. The structure of the actuator 180, 400, 500, for example an arm 402, 502 may provide an air flow passage 602 (as described above, for example). The air flow passage 602 may have a relatively large cross-sectional area. The air flow passage 602 may extend between an inlet 624 and the air flow generator 620.

An air flow sensor 636 may be provided to measure air flow in the air flow passage 602. The air flow sensor 636 may be a differential pressure sensor which is capable of measuring pressure on either side of an obstruction 638 in the air flow passage 602. The obstruction 638 may create turbulence in the air flow in the air flow passage 602. The obstruction may be formed such that it narrows the cross-sectional area of the air flow passage 602. The obstruction may be configured to create a ‘Venturi’ effect within the air flow passage 602. Additionally or alternatively, the air flow sensor 636 may measure pressure in the air flow passage 602 with respect to an ambient pressure. The air flow sensor 636 may measure total pressure in the air flow passage 602 with respect to an ambient pressure. The ambient pressure may be the pressure outside of the air flow passage 602. The pressure in the air flow passage 602 may be determined by a Pitot tube 637. The Pitot tube 637 may include a slender tube having a first opening and a second opening. The first opening may be placed in the air flow passage 602 and may measure a stagnation pressure (the total pressure). The second opening may be positioned outside the air flow passage 602 to measure a static pressure (the ambient pressure); the difference between the stagnation pressure and the ambient pressure may give a value for dynamic pressure. Thus, the dynamic pressure may be determined by the air flow sensor 636. Usage of the Pitot tube 637 may be advantageous, since the Pitot tube 637 may have a diameter that may be significantly smaller than the air flow passage 602, thus turbulence caused by the Pitot tube 637 may be negligible. The first opening of the Pitot tube 637 may be positioned adjacent a wall of the air flow passage 602. The position of the Pitot tube may be selected so as to minimise or reduce turbulence in the fluid in the air flow passage 602 caused by the presence of the Pitot tube 637. The first opening of the Pitot tube 637 may be positioned in the air flow passage such that it is spaced from the inlet 624. The first opening of the Pitot tube may be closer to the air flow generator 620 than the inlet 624.

The air flow sensor 636 may include a diaphragm, and may be of a kind manufactured by Honeywell. The air flow sensor 636 may be a bypass-based sensor, and may be of a kind manufactured by Sensiron™.

The air flow sensor 636 may be provided on a static part of the actuator 180, 400, 500. Positioning the air flow sensor 636 on a static part of the actuator 180, 400, 500 eliminates the requirement to provide flexible electrical connections to the moving part of the actuator 180, 400, 500.

In use, the air flow generator creates an air flow in the air flow passage 602. The air flow sensor 636 monitors air flow in the air flow passage 602. The obstacle 638 creates a local disturbance in the air flow, such that there is a difference in the air pressure on either side of the obstacle 638. Alternatively, the Pitot tube 637 measures the stagnation pressure (the total pressure) in the air flow passage 602 and the static pressure (the ambient pressure). The air flow sensor 636 measures the total pressure with respect to the ambient pressure (the dynamic pressure).

When a label 12, 13 is approaching the applicator pad 10, 201 or is positioned adjacent the applicator pad 10, 210, the inlet 624 is blocked by the label 12, 13 such that air flow through the air flow passage 602 is inhibited or prevented. The air flow sensor 636 detects a reduction in or loss of air flow in the air flow passage 602, which indicates that a label 12, 13 is nearing the applicator pad 10, 210, or is adjacent the applicator pad 10, 210. It is possible to measure the air flow at any location in the air flow passage 602 to determine the presence of a label 12, 13. It is possible to measure the air flow at a position in the air flow passage 602, which is distant from the applicator pad 10, 210. It is possible for the presence of a label to be detected by a sensor which is positioned on or in a static part of the actuator or other part of the labelling apparatus. It is possible to use this method in any kind of actuator, for example linear or rotary actuators.

It is possible to detect labels 12, 13 irrespective of the optical properties of the label 12, 13. For example it may be possible to detect transparent labels. The label detection apparatus is robust against pollution, for example debris which can obstruct an optical system and give false results. It is not necessary to have electrical cables and/or tubes connected to the moving part of the actuator and/or the applicator pad, which reduces the risk of damage and/or failure, and simplified maintenance and/or replacement of components of the label detection apparatus 600. This also means that the moving part(s) of the actuator 180, 400, 500 are lightweight compared with existing actuators, thus providing or maintaining the advantages described above in relation to the lightness of the actuators 400, 500.

The less turbulence caused or created in the fluid in the air flow passage 602, the more accurate the measurement of pressure, and hence the more accurate the determination of air flow, and the more accurate the determination of whether a label is present at or near the inlet 624. The less turbulent the air flow in the air flow passage 602, the better the signal to noise ratio in measurement data used to determine the presence or absence of a label. Use of the Pitot tube 637 is advantageous in reducing or minimising turbulence in the air flow in the air flow passage 602. Therefore use of a Pitot tube 637 as the air flow sensor 636 may be particularly advantageous. The configuration (for example dimensions) and position of the Pitot tube 637 may be selected so as to optimise the ability to determine the presence or absence of a label. This optimisation may be performed by optimising or minimising the effect of the presence of the Pitot tube on the turbulence in the air flow in the air flow passage 602.

The label detection apparatus 600 and the label detection method described herein may be used in conjunction with any or all of the other features and/or components of the labelling apparatus described herein and/or shown in the Figures.

Representative features are set out in the following clauses, which stand alone or may be combined, in any combination, with one or more features disclosed in the text and/or drawings of the specification.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

CLAUSES

1. An applicator apparatus including an applicator pad and an actuator for positioning the applicator pad in a desired position, the applicator pad being attached to the actuator by an attachment member, wherein the attachment member enables articulation between the applicator pad and the actuator.
2. An applicator apparatus according to clause 1 wherein a part of the attachment member is arranged to slidably engage with a part of the applicator pad.
3. An applicator apparatus according to clause 1 or clause 2 wherein the attachment member includes an engagement member which is arranged to engage with an engagement formation of the applicator pad in a dovetail arrangement.
4. An applicator apparatus according to any of the preceding clauses wherein the attachment member and the applicator pad are configured to snap-fit with one another.
5. An applicator apparatus according to any of the preceding clauses including a locking formation for locking the applicator pad in attachment with the actuator.
6. An applicator apparatus according to clause 1 or clause 2 wherein the attachment member includes a universal joint.
7. An applicator apparatus according to any of the preceding clauses wherein the attachment member enables pneumatic coupling between the applicator pad and the actuator.
8. An applicator apparatus according to any of the preceding clauses including an air flow generator.
9. An applicator apparatus according to clause 8 wherein the air flow generator is carried by a part of the actuator.
10. An applicator apparatus according to clause 8 or clause 9 wherein the air flow generator is located on a stationary part of the applicator apparatus.
11. An applicator apparatus according to any of clauses 8 to 10 wherein the air flow generator is operable to produce an air flow with an air pressure of up to approximately 1000 Pa.
12. An applicator apparatus according to any of the preceding clauses wherein, the applicator pad has a first, label receiving side and a second side, a label entrance edge and an opposite edge, a fluid inlet and a fluid conduit arrangement which is fluidly communicable with the fluid inlet to deliver fluid from the fluid inlet to a plurality of positions on the first label receiving side.
13. An applicator apparatus according to clause 12 where dependent upon any of clauses 8 to 11, wherein the fluid inlet of the applicator pad is fluidly communicable with the air flow generator via the attachment member.
14. An applicator apparatus according to clause 12 or 13 wherein the fluid inlet is positioned near to the label entrance edge of the applicator pad and at least a part of the conduit arrangement extends away from the label entrance edge of the applicator pad towards the opposite edge of the applicator pad.
15. An applicator apparatus according to any of clauses 12 to 14 wherein the fluid conduit arrangement includes a plurality of conduits.
16. An applicator apparatus according to clause 15 wherein two or more of the plurality of conduits include respective portions which are substantially parallel with one another.
17. An applicator apparatus according to any of clauses 12 to 16 wherein the cross-sectional area of the fluid inlet is approximately 25% to 75% of the area of the applicator pad, and is preferably approximately 50% of the area of the applicator pad.
18. An applicator apparatus according to any of clauses 12 to 17, wherein the label receiving side of the applicator pad includes a portion having a roughened surface, the portion covering at least a part of the first, label receiving side of the applicator pad.

19. An applicator apparatus according to clause 18 wherein the roughened surface is provided by an additive manufacturing process and/or a moulding process.
20. An applicator apparatus according to any of the preceding clauses wherein the applicator pad includes one or more stiffening ribs.
21. An applicator apparatus according to any of the preceding clauses, where dependent upon any of claims 12 to 20, wherein the applicator pad includes one or more nozzles terminating at or near the label receiving side of the applicator pad, the or each nozzle being fluidly communicable with a pressurised fluid source.
22. An applicator apparatus according to clause 21 where dependent upon any of clauses 8 to 11, wherein the pressurised fluid source is the air flow generator.
23. An applicator apparatus according to clause 21 or clause 22 including a plurality of nozzles, at least some of which are fluidly communicable with the source of pressurised fluid via a distribution chamber.
24. An applicator apparatus according to any of clauses 21 to 23 including at least one opening in the label side of the applicator pad, the or each opening being associated with a corresponding nozzle.
25. An applicator apparatus according to clause 24 wherein each opening surrounds the corresponding nozzle.
26. An applicator apparatus including an applicator pad for applying a label to an item, an air flow generator, an air guide for guiding the air flow between the air flow generator and the applicator pad, and a label detector for detecting the presence of a label adjacent the applicator pad, wherein the label detector includes a flow sensor for measuring air flow at a location between the air flow generator and the applicator pad.
27. An applicator apparatus according to clause 26 wherein the flow sensor is a differential pressure sensor.
28. An applicator apparatus according to clause 27 wherein the air guide includes an obstacle, and the differential pressure sensor measures air pressure on both sides of the obstacle.
29. An applicator apparatus according to any of clauses 1 to 25 and being further dependent upon any of clauses 26 to 28.
30. An actuator for an applicator apparatus, the actuator being operable to position an applicator pad in a desired position relative to an item to which a label is to be applied, the actuator including one of an extruded or pultruded body to which the applicator pad is connectable.
31. An actuator according to clause 30 including at least two telescopic bodies.
32. An actuator according to clause 30 or 31 wherein the actuator body enables fluid communication between the applicator pad and a source of pressurised fluid and/or an air flow generator.
33. An actuator according to any of clauses 30 to 32 including at least one bearing member which is engageable with a part of a label printing apparatus to facilitate movement of at least a part of the actuator relative to the part of the label printing apparatus.
34. An actuator according to clause 33 wherein the or each bearing member is a roller.
35. An applicator apparatus including an actuator according to any of clauses 30 to 34.
36. An applicator apparatus according to any of clauses 1 to 29 including an actuator according to any of clauses 30 to 35.
37. A method of controlling an applicator apparatus including an applicator pad for applying a label to an item, an actuator for positioning the applicator pad in a desired position relative to an item, and a control system for controlling movement of the actuator, the control system including at least one motor, the method including determining a desired position of the applicator pad, determining a required speed of the actuator to achieve the desired position of the applicator pad, taking into account at least one physical parameter of the actuator and/or the applicator pad, and calculating a motor torque required to achieve the desired position of the applicator pad, taking into account a current position of the applicator pad.
38. A method of controlling an applicator apparatus according to clause 37 including determining an impact of the applicator pad with the item by detecting one or more of an increase in motor current, a change in speed of movement of the actuator and an increase in a difference value between the desired position of the applicator pad and an actual position of the applicator pad.
39. A method according to clause 37 or clause 38 wherein an impact zone is determined, and the control system operates under different conditions when the actual position of the applicator pad is determined to be within the impact zone.
40. A method of controlling an applicator apparatus according to clause 39, for applying a label to each of a series of items, wherein the control system is operable to determine a respective impact zone associated with each item to which a label is to be applied.
41. A method according to clause 39 or clause 40 including reducing control stiffness, and/or operating the motor in an open-loop torque mode and/or utilising a model-based feed-forward algorithm to control the motor when the applicator pad is determined to be in the impact zone.
42. A method according to any of clauses 37 to 41 including adjusting the control parameters of the control system in response to detecting a collision between the applicator pad and the item.

The invention claimed is:

1. An applicator apparatus including an applicator pad and an actuator for positioning the applicator pad in a desired position, the applicator pad being attached to the actuator by an attachment member, wherein the attachment member enables articulation between the applicator pad and the actuator, and wherein the attachment member enables pneumatic coupling between the applicator pad and the actuator.

2. An applicator apparatus according to claim 1 wherein a part of the attachment member is arranged to slidably engage with a part of the applicator pad, and/or wherein the attachment member includes an engagement member which is arranged to engage with an engagement formation of the applicator pad in a dovetail arrangement, and/or wherein the attachment member and the applicator pad are configured to snap-fit with one another, and/or wherein the applicator apparatus includes a locking formation configured to receive a locking member to lock the applicator pad in attachment with the actuator.

3. An applicator apparatus according to claim 1 wherein the attachment member includes a universal joint.

4. An applicator apparatus according to claim 1 including an air flow generator and optionally wherein the air flow generator is carried by a part of the actuator or alternatively wherein the air flow generator is located on a stationary part of the applicator apparatus.

5. An applicator apparatus according to claim 4 wherein the air flow generator is configured to produce an air flow with an air pressure of up to approximately 1000 Pa.

6. An applicator apparatus according to claim 1 wherein, the applicator pad has a first, label receiving side and a second side, a label entrance edge and an opposite edge, a fluid inlet and a fluid conduit arrangement which is fluidly communicable with the fluid inlet to deliver fluid from the fluid inlet to a plurality of positions on the first label receiving side.

7. An applicator apparatus according to claim 6, including an air flow generator and wherein the fluid inlet of the applicator pad is fluidly communicable with the air flow generator via the attachment member.

8. An applicator apparatus according to claim 7 wherein the fluid inlet is positioned adjacent the label entrance edge of the applicator pad and at least a part of the conduit arrangement extends away from the label entrance edge of the applicator pad towards the opposite edge of the applicator pad, and/or wherein the fluid conduit arrangement includes a plurality of conduits.

9. An applicator apparatus according to claim 8 wherein two or more of the plurality of conduits include respective portions which are substantially parallel with one another.

10. An applicator apparatus according to claim 6 wherein the cross-sectional area of the fluid inlet is approximately 25% to 75% of the area of the applicator pad, and is preferably approximately 50% of the area of the applicator pad, and/or wherein the label receiving side of the applicator pad includes a portion having a roughened surface, the portion covering at least a part of the first, label receiving side of the applicator pad, and optionally the roughened surface is provided by an additive manufacturing process and/or a moulding process.

11. An applicator apparatus according to claim 1 wherein the applicator pad includes one or more stiffening ribs.

12. An applicator apparatus according to claim 6, wherein the applicator pad includes one or more nozzles terminating adjacent the label receiving side of the applicator pad, the or each nozzle being fluidly communicable with a pressurised fluid source.

13. An applicator apparatus according to claim 12 including an air flow generator, wherein the pressurised fluid source is the air flow generator, and/or including a plurality of nozzles, at least some of the plurality of nozzles being fluidly communicable with the source of pressurised fluid via a distribution chamber, and/or including at least one opening in the label side of the applicator pad, the or each opening being associated with a corresponding nozzle and optionally wherein each opening surrounds the corresponding nozzle.

14. An applicator apparatus including an applicator pad for applying a label to an item, an air flow generator, an air guide configured to guide the air flow between the air flow generator and the applicator pad, and a label detector configured to detect the presence of a label adjacent the applicator pad, wherein the label detector includes a differential pressure sensor configured to measure air flow at a location between the air flow generator and the applicator pad.

15. An applicator apparatus according to claim 14 wherein the air guide includes an obstacle, and the differential pressure sensor measures air pressure on both sides of the obstacle.

16. An actuator for an applicator apparatus, the actuator being operable to position an applicator pad in a desired position relative to an item to which a label is to be applied, the actuator including one of an extruded or pultruded actuator body to which the applicator pad is connectable.

17. An actuator according to claim 16 including at least two telescopic bodies, and/or wherein the actuator body enables fluid communication between the applicator pad and a source of pressurised fluid and/or an air flow generator, and/or wherein the actuator includes at least one bearing member which is engageable with a part of a label printing apparatus to facilitate movement of at least a part of the actuator relative to the part of the label printing apparatus and optionally wherein the or each bearing member is a roller.

18. An applicator apparatus including an actuator according to claim 16.

19. A method of controlling an applicator apparatus including an applicator pad for applying a label to an item, an actuator for positioning the applicator pad in a desired position relative to an item, and a control system for controlling movement of the actuator, the control system including at least one motor, the method including determining a desired position of the applicator pad, determining a required speed of the actuator to achieve the desired position of the applicator pad, taking into account at least one physical parameter of the actuator and/or the applicator pad, and calculating a motor torque required to achieve the desired position of the applicator pad, taking into account a current position of the applicator pad.

20. A method of controlling an applicator apparatus according to claim 19 including determining an impact of the applicator pad with the item by detecting one or more of an increase in motor current, a change in speed of movement of the actuator and an increase in a difference value between the desired position of the applicator pad and an actual position of the applicator pad.

21. A method according to claim 19 wherein an impact zone is determined, and the control system operates under different conditions when the actual position of the applicator pad is determined to be within the impact zone, and optionally when applying a label to each of a series of items, wherein the control system is operable to determine a respective impact zone associated with each item to which a label is to be applied, and optionally including reducing control stiffness, and/or operating the motor in an open-loop torque mode and/or utilising a model-based feed-forward algorithm to control the motor when the applicator pad is determined to be in the impact zone.

22. A method according to claim 19 including adjusting the control parameters of the control system in response to detecting a collision between the applicator pad and the item.

* * * * *